US010191850B2

(12) United States Patent
Verrilli et al.

(10) Patent No.: US 10,191,850 B2
(45) Date of Patent: Jan. 29, 2019

(54) PROVIDING MEMORY BANDWIDTH COMPRESSION USING MULTIPLE LAST-LEVEL CACHE (LLC) LINES IN A CENTRAL PROCESSING UNIT (CPU)-BASED SYSTEM

(71) Applicant: QUALCOMM Incorporated, San Diego, CA (US)

(72) Inventors: Colin Beaton Verrilli, Apex, NC (US); Mattheus Cornelis Antonius Adrianus Heddes, Raleigh, NC (US); Mark Anthony Rinaldi, Durham, NC (US); Natarajan Vaidhyanathan, Carrboro, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/086,817

(22) Filed: Mar. 31, 2016

(65) Prior Publication Data

US 2017/0286308 A1 Oct. 5, 2017

(51) Int. Cl.
*G06F 12/08* (2016.01)
*G06F 12/0875* (2016.01)
(Continued)

(52) U.S. Cl.
CPC .......... *G06F 12/0875* (2013.01); *G06F 12/04* (2013.01); *G06F 12/084* (2013.01);
(Continued)

(58) Field of Classification Search
CPC .... G06F 12/04; G06F 12/0811; G06F 12/084; G06F 12/0862; G06F 12/0875;
(Continued)

(56) References Cited

U.S. PATENT DOCUMENTS 5,376,968 A 12/1994 Wu et al.
5,696,927 A 12/1997 MacDonald et al.
(Continued)

FOREIGN PATENT DOCUMENTS

WO 2015142341 A1 9/2015

OTHER PUBLICATIONS

Chen, Long et al., "Free ECC: An Efficient Error Protection for Compressed Last-Level Caches," 2013 IEEE 31st International Conference on Computer Design (ICCD), Oct. 1, 2013, pp. 278-285.
(Continued)

*Primary Examiner* — Yong J Choe
(74) *Attorney, Agent, or Firm* — Withrow & Terranova, PLLC

(57) ABSTRACT

Providing memory bandwidth compression using multiple last-level cache (LLC) lines in a central processing unit (CPU)-based system is disclosed. In some aspects, a compressed memory controller (CMC) provides an LLC comprising multiple LLC lines, each providing a plurality of sub-lines the same size as a system cache line. The contents of the system cache line(s) stored within a single LLC line are compressed and stored in system memory within the memory sub-line region corresponding to the LLC line. A master table stores information indicating how the compressed data for an LLC line is stored in system memory by storing an offset value and a length value for each sub-line within each LLC line. By compressing multiple system cache lines together and storing compressed data in a space normally allocated to multiple uncompressed system lines, the CMC enables compression sizes to be smaller than the memory read/write granularity of the system memory.

22 Claims, 16 Drawing Sheets

(51) Int. Cl.
  *G06F 12/0897* (2016.01)
  *G06F 12/04* (2006.01)
  *G06F 12/084* (2016.01)
  *G06F 12/12* (2016.01)
  *G06F 12/0811* (2016.01)
  *G06F 12/0862* (2016.01)

(52) U.S. Cl.
  CPC .......... *G06F 12/0897* (2013.01); *G06F 12/12* (2013.01); *G06F 12/0811* (2013.01); *G06F 12/0862* (2013.01); *G06F 2212/1016* (2013.01); *G06F 2212/1044* (2013.01); *G06F 2212/401* (2013.01)

(58) Field of Classification Search
  CPC ................. G06F 12/0897; G06F 12/12; G06F 2212/1016; G06F 2212/1044; G06F 2212/401
  See application file for complete search history.

(56) References Cited

U.S. PATENT DOCUMENTS

| | | | |
|---|---|---|---|
| 6,170,047 | B1 | 1/2001 | Dye |
| 6,523,102 | B1 | 2/2003 | Dye et al. |
| 6,735,673 | B2 | 5/2004 | Kever |
| 6,795,897 | B2 | 9/2004 | Benveniste et al. |
| 6,981,119 | B1 | 12/2005 | Lepak et al. |
| 7,162,583 | B2 | 1/2007 | Adl-Tabatabai et al. |
| 7,302,543 | B2 | 11/2007 | Lekatsas et al. |
| 7,636,810 | B2 | 12/2009 | Ramakrishnan |
| 7,636,813 | B2 | 12/2009 | Tremaine |
| 7,844,793 | B2 | 11/2010 | Herger et al. |
| 8,037,251 | B2 | 10/2011 | Borkenhagen |
| 8,175,402 | B2 | 5/2012 | Funatsu et al. |
| 8,176,288 | B2 | 5/2012 | Dye |
| RE43,483 | E | 6/2012 | Geiger et al. |
| 8,341,380 | B2 | 12/2012 | Deming et al. |
| 8,441,495 | B1 | 5/2013 | Van Dyke et al. |
| 8,510,518 | B2 | 8/2013 | O'Connor |
| 8,539,163 | B1 | 9/2013 | Sivasubramanian et al. |
| 8,751,830 | B2 | 6/2014 | Muff et al. |
| 8,806,108 | B2 | 8/2014 | Suzuki et al. |
| 9,098,202 | B2 | 8/2015 | Yokoi et al. |
| 9,355,038 | B2 | 5/2016 | Patsilaras et al. |
| 2003/0135694 | A1 | 7/2003 | Naffziger et al. |
| 2003/0191903 | A1 | 10/2003 | Sperber et al. |
| 2003/0217237 | A1 | 11/2003 | Benveniste et al. |
| 2004/0030847 | A1 | 2/2004 | Tremaine |
| 2004/0255209 | A1 | 12/2004 | Gross |
| 2005/0071566 | A1 | 3/2005 | Adl-Tabatabai et al. |
| 2005/0114601 | A1 | 5/2005 | Ramakrishnan et al. |
| 2005/0144388 | A1 | 6/2005 | Newburn et al. |
| 2005/0160234 | A1 | 7/2005 | Newburn et al. |
| 2006/0139188 | A1 | 6/2006 | Sasakura |
| 2011/0066808 | A1* | 3/2011 | Flynn .................. G06F 12/0246 711/118 |
| 2013/0179752 | A1 | 7/2013 | Shim et al. |
| 2014/0092678 | A1 | 4/2014 | Feekes |
| 2014/0095561 | A1 | 4/2014 | Wegener |
| 2014/0208003 | A1* | 7/2014 | Cohen .................... G11C 16/08 711/103 |
| 2014/0244962 | A1 | 8/2014 | Arges et al. |
| 2015/0304441 | A1 | 10/2015 | Ichien |
| 2015/0339228 | A1 | 11/2015 | Heddes et al. |
| 2015/0339237 | A1 | 11/2015 | Heddes et al. |
| 2015/0339239 | A1 | 11/2015 | Heddes et al. |
| 2016/0055088 | A1 | 2/2016 | Zhang et al. |
| 2017/0068621 | A1* | 3/2017 | Watanabe ........... G06F 12/0891 |
| 2018/0018268 | A1 | 1/2018 | Verrilli et al. |
| 2018/0074949 | A1 | 3/2018 | Verrilli et al. |

OTHER PUBLICATIONS

International Search Report and Written Opinion for PCT/US2017/022060, dated May 30, 2017, 20 pages.
Author Unknown, "Understanding Memory Resource Management in VMware ESX 4.1," Vmware, Inc., 2010, retrieved from http://www.vmware.com/files/pdf/techpaper/vsp_41_perf_memory_mgmt.pdf, 25 pages.
Dekhimenko, G. et al., "Linearly Compressed Pages: A Low-Complexity,Low-Latency Main Memory Compression Framework," Proceedings of the 46th Annual IEEE/ACM International Symposium on Microarchitecture (MICRO-46), Dec. 7-11, 2013, Davis, CA, ACM, 13 pages.
Second Written Opinion for PCT/US2017/022060, dated Mar. 2, 2018, 11 pages.
International Preliminary Report on Patentability for PCT/US2017/022060, dated May 28, 2018, 12 pages.
Huang, Shanshan et al., "A Novel Compression Algorithm Decision Method for Spark Shuffle Process," 2017 IEEE International Conference on Big Data (BIGDATA), Dec. 11-14, 2017, pp. 2931-2940.
Omote, Masayuki et al., "Efficient Data Communication using Dynamic Switching of Compression Method," 2013 First International Symposium on Computing and Networking, Dec. 4-6, 2013, pp. 607-611.

* cited by examiner

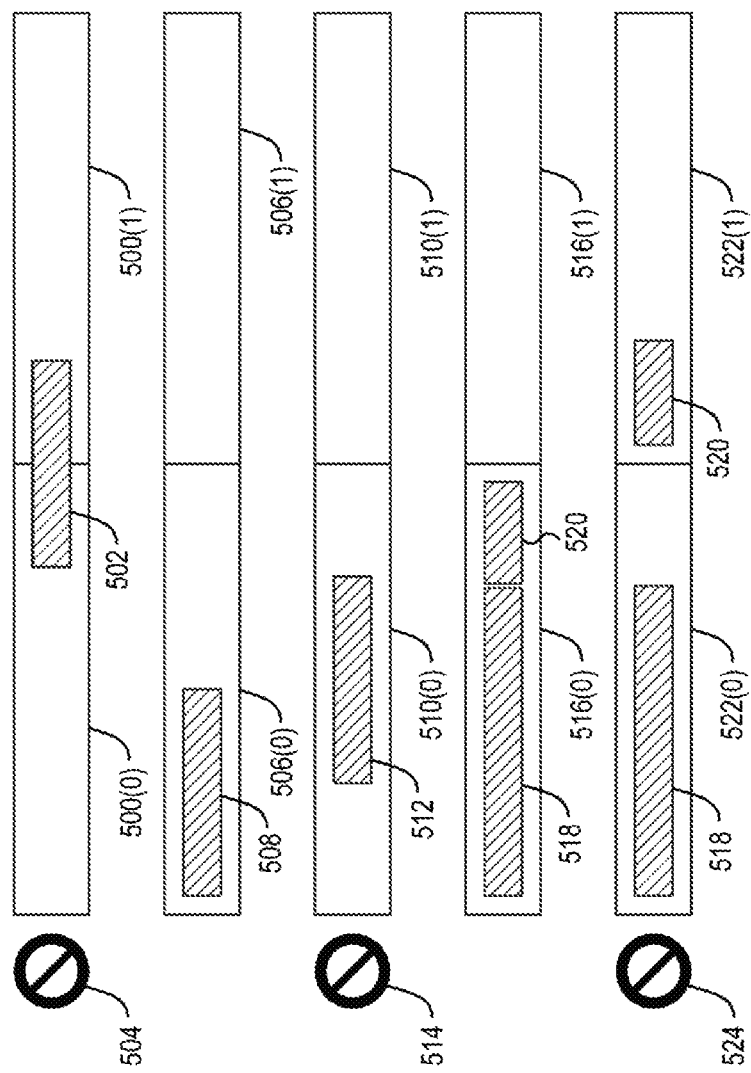

PROVIDING MEMORY BANDWIDTH COMPRESSION USING MULTIPLE LAST-LEVEL CACHE (LLC) LINES IN A CENTRAL PROCESSING UNIT (CPU)-BASED SYSTEM

BACKGROUND

I. Field of the Disclosure

The technology of the disclosure relates generally to computer memory systems, and, in particular, to memory controllers in computer memory systems for providing central processing units (CPUs) with a memory access interface to memory.

II. Background

Microprocessors perform computational tasks for a wide variety of applications. A typical microprocessor application includes one or more central processing units (CPUs) that execute software instructions. The software instructions may instruct a CPU to fetch data from a location in memory, perform one or more CPU operations using the fetched data, and generate a result. The result may then be stored in memory. As non-limiting examples, this memory can be a cache local to the CPU, a shared local cache among CPUs in a CPU block, a shared cache among multiple CPU blocks, or main memory of the microprocessor.

In this regard, FIG. 1 is a schematic diagram of an exemplary system-on-a-chip (SoC) 100 that includes a CPU-based system 102. The CPU-based system 102 includes a plurality of CPU blocks 104(0)-104(N) in this example, wherein 'N' is equal to any number of CPU blocks 104(0)-104(N) desired. In the example of FIG. 1, each of the CPU blocks 104(0)-104(N) contains two (2) CPUs 106(0), 106(1). The CPU blocks 104(0)-104(N) further contain shared Level 2 (L2) caches 108(0)-108(N), respectively. A system cache 110 (e.g., a Level 3 (L3) cache) is also provided for storing cached data that is used by any of, or shared among, each of the CPU blocks 104(0)-104(N). An internal system bus 112 is provided to enable each of the CPU blocks 104(0)-104(N) to access the system cache 110 as well as other shared resources. Other shared resources accessed by the CPU blocks 104(0)-104(N) through the internal system bus 112 may include a memory controller 114 for accessing a main, external memory (e.g., double-rate dynamic random access memory (DRAM) (DDR), as a non-limiting example), peripherals 116, other storage 118, an express peripheral component interconnect (PCI) (PCI-e) interface 120, a direct memory access (DMA) controller 122, and/or an integrated memory controller (IMC) 124.

As CPU-based applications executing in the CPU-based system 102 in FIG. 1 increase in complexity and performance, limitations on memory bandwidth may impose a constraint on the CPU-based system 102. If accesses to external memory reach memory bandwidth limits, the memory controller 114 of the CPU-based system 102 may be forced to queue memory access requests. Such queuing of memory access requests may increase the latency of memory accesses, which in turn may decrease the performance of the CPU-based system 102.

Memory bandwidth savings may be realized by employing memory bandwidth compression schemes to potentially reduce the bandwidth consumed by a given memory access. However, the memory architecture underlying a system memory of the CPU-based system 102 may limit reads and writes to the system memory to memory granules having a specified minimum size (referred to herein as "memory read/write granularity"). As a result, conventional memory bandwidth compression schemes limit the size of "bins," or compressed blocks, to the same size as the memory read/write granularity of the system memory using the memory bandwidth compression scheme. Thus, for example, a memory system having a memory read/write granularity of 64 bytes and a memory line size of 128 bytes may only provide two (2) compressed memory sizes for each memory line: 64 bytes (i.e., 1 bin) or 128 bytes (i.e., 2 bins).

It is therefore desirable to provide a memory bandwidth compression mechanism that may effectively provide a larger number of bins.

SUMMARY OF THE DISCLOSURE

Aspects disclosed herein include providing memory bandwidth compression using multiple last-level cache (LLC) lines in a central processing unit (CPU)-based system. In one aspect, a compressed memory controller (CMC) is configured to reduce memory bandwidth requirements by improving a line compression ratio achievable with memory that is limited to a particular memory read/write granularity. The CMC is communicatively coupled to a system cache having a particular system cache line size (e.g., 128 bytes). In some aspects, the system cache may comprise a Level 2 (L2) cache or a Level 3 (L3) cache, as non-limiting examples. The CMC is further coupled to an LLC comprising multiple LLC lines, each of which provides a plurality of sub-lines that are each the same size as the system cache line size. Each LLC line stores uncompressed data, and one or more sub-lines of the LLC line corresponding to a system cache line may be independently marked as valid.

The contents of the system cache line(s) that are stored within a single LLC line are compressed and stored in system memory within the memory sub-line region corresponding to the LLC line. A master table (and, optionally, a master table (MT) cache) is used to store information indicating how the compressed data corresponding to a given LLC line is stored in system memory (e.g., by storing an offset value and a length value for each sub-line within each LLC line). By compressing one or more system cache lines together and storing compressed data in a space in the system memory that is normally allocated to multiple uncompressed system lines, the bandwidth compression mechanism provided by the LLC and the master table enables the bin size to be smaller than the memory granule size of the system memory. The CMC may improve memory bandwidth by effectively pre-fetching compressed data for a sub-line when retrieving compressed data for another sub-line within the same LLC line. By reading and/or writing multiple sub-lines from the LLC in combination, the CMC may be able to utilize memory access bandwidth that would otherwise be wasted due to the memory read/write granularity.

In another aspect, a CMC is provided. The CMC comprises a memory interface configured to access a system memory and a system cache via a system bus. The CMC is communicatively coupled to an LLC comprising a plurality of LLC lines, each of which is sized to store a plurality of sub-lines corresponding to a plurality of system cache lines of the system cache. The CMC is configured to receive, from the system cache, a memory read request comprising a memory address. The CMC is further configured to determine whether the memory address corresponds to a valid sub-line of the plurality of sub-lines within an LLC line of the plurality of LLC lines of the LLC. The CMC is also configured to, responsive to determining that the memory address does not correspond to a valid sub-line of the plurality of sub-lines within an LLC line of the plurality of LLC lines of the LLC, read a master table entry containing an offset value and a length value for the LLC line from a master table in the system memory. The CMC is additionally configured to retrieve one or more blocks from the system memory based on the memory address, the offset value, and the length value. The CMC is further configured to store data from the retrieved one or more blocks in a sub-line of the plurality of sub-lines within an LLC line of the plurality of LLC lines of the LLC. The CMC is also configured to return the data from the retrieved one or more blocks to the system cache.

In another aspect, a CMC is provided. The CMC comprises a memory interface configured to access a system memory and a system cache via a system bus. The CMC is communicatively coupled to an LLC comprising a plurality of LLC lines, each of which is sized to store a plurality of sub-lines corresponding to a contiguous plurality of system cache lines of the system cache. The CMC is configured to receive, from the system cache, a memory write request comprising write data and a memory address. The CMC is further configured to determine whether the memory address corresponds to a sub-line of the plurality of sub-lines of an LLC line within the plurality of LLC lines of the LLC. The CMC is also configured to, responsive to determining that the memory address does not correspond to a sub-line of the plurality of sub-lines within an LLC line of the plurality of LLC lines of the LLC, select an LLC line within the plurality of LLC lines of the LLC as an eviction LLC line. The CMC is additionally configured to, for each sub-line of the plurality of sub-lines of the eviction LLC line containing modified data, compress data from the sub-line. The CMC is further configured to generate an updated offset value and an updated length value for the sub-line based on the compressed data from the sub-line. The CMC is also configured to store the compressed data for the sub-line in one or more blocks of the system memory based on the updated offset value and the updated length value for the sub-line. The CMC is additionally configured to store the updated offset value and the updated length value in a master table entry for the sub-line in a master table. The CMC is further configured to store the write data in the sub-line of the plurality of sub-lines of the eviction LLC line.

In another aspect, a method for providing memory bandwidth compression for memory read operations is provided. The method comprises receiving, by a CMC from a system cache, a memory read request comprising a memory address. The method further comprises determining whether the memory address corresponds to a valid sub-line of a plurality of sub-lines within an LLC line of a plurality of LLC lines of an LLC. The method also comprises, responsive to determining that the memory address does not correspond to a valid sub-line of the plurality of sub-lines within an LLC line of the plurality of LLC lines of the LLC, reading a master table entry containing an offset value and a length value for the LLC line from a master table in a system memory. The method additionally comprises retrieving one or more blocks from the system memory based on the memory address, the offset value, and the length value. The method further comprises storing data from the retrieved one or more blocks in a sub-line of the plurality of sub-lines within an LLC line of the plurality of LLC lines of the LLC. The method also comprises returning the data from the retrieved one or more blocks to the system cache.

In another aspect, a method for providing memory bandwidth compression for memory write operations is provided. The method comprises receiving, by a CMC from a system cache, a memory write request comprising write data and a memory address. The method further comprises determining whether the memory address corresponds to a sub-line of a plurality of sub-lines within an LLC line of a plurality of LLC lines of an LLC. The method also comprises, responsive to determining that the memory address does not correspond to a sub-line of the plurality of sub-lines within an LLC line of the plurality of LLC lines of the LLC, selecting an LLC line within the plurality of LLC lines of the LLC as an eviction LLC line. The method additionally comprises, for each sub-line of the plurality of sub-lines of the eviction LLC line containing modified data, compressing data from the sub-line. The method further comprises generating an updated offset value and an updated length value for the sub-line based on the compressed data from the sub-line. The method also comprises storing the compressed data for the sub-line in one or more blocks of a system memory based on the updated offset value and the updated length value for the sub-line. The method additionally comprises storing the updated offset value and the updated length value in a master table entry for the sub-line in a master table. The method further comprises storing the write data in a sub-line of the plurality of sub-lines of the eviction LLC line.

In another aspect, a CMC is provided. The CMC comprises a means for receiving, from a system cache, a memory read request comprising a memory address. The CMC further comprises a means for determining whether the memory address corresponds to a valid sub-line of a plurality of sub-lines within an LLC line of a plurality of LLC lines of an LLC. The CMC also comprises a means for reading a master table entry containing an offset value and a length value for the LLC line from a master table in a system memory, responsive to determining that the memory address does not correspond to a valid sub-line of the plurality of sub-lines within an LLC line of the plurality of LLC lines of the LLC. The CMC additionally comprises a means for retrieving one or more blocks from the system memory based on the memory address, the offset value, and the length value. The CMC further comprises a means for storing data from the retrieved one or more blocks in a sub-line of the plurality of sub-lines within an LLC line of the plurality of LLC lines of the LLC. The CMC also comprises a means for returning the data from the retrieved one or more blocks to the system cache.

In another aspect, a CMC is provided. The CMC comprises a means for receiving, from a system cache, a memory write request comprising write data and a memory address. The CMC further comprises a means for determining whether the memory address corresponds to a sub-line of a plurality of sub-lines within an LLC line of a plurality of LLC lines of an LLC. The CMC also comprises a means for selecting an LLC line within the plurality of LLC lines of the LLC as an eviction LLC line, responsive to determining that the memory address does not correspond to a sub-line of the plurality of sub-lines within an LLC line of the plurality of LLC lines of the LLC. The CMC additionally comprises a means for compressing data from each sub-line of the plurality of sub-lines of the eviction LLC line containing modified data. The CMC further comprises a means for generating, for each sub-line of the plurality of sub-lines of the eviction LLC line containing modified data, an updated offset value and an updated length value based on the compressed data from the sub-line. The CMC also comprises a means for storing, for each sub-line of the plurality of sub-lines of the eviction LLC line containing modified data, the compressed data in one or more blocks of a system memory based on the updated offset value and the updated length value for the sub-line. The CMC additionally comprises a means for storing, for each sub-line of the plurality of sub-lines of the eviction LLC line containing modified data, the updated offset value and the updated length value in a master table entry for the sub-line in a master table. The CMC further comprises a means for storing the write data in a sub-line of the plurality of sub-lines of the eviction LLC line.

BRIEF DESCRIPTION OF THE FIGURES

FIG. 5 is a block diagram illustrating allocation rules that may be applied by the CMC of FIG. 2 for generating an offset value for compressed data to be stored in a system memory;

DETAILED DESCRIPTION

Figure 1:
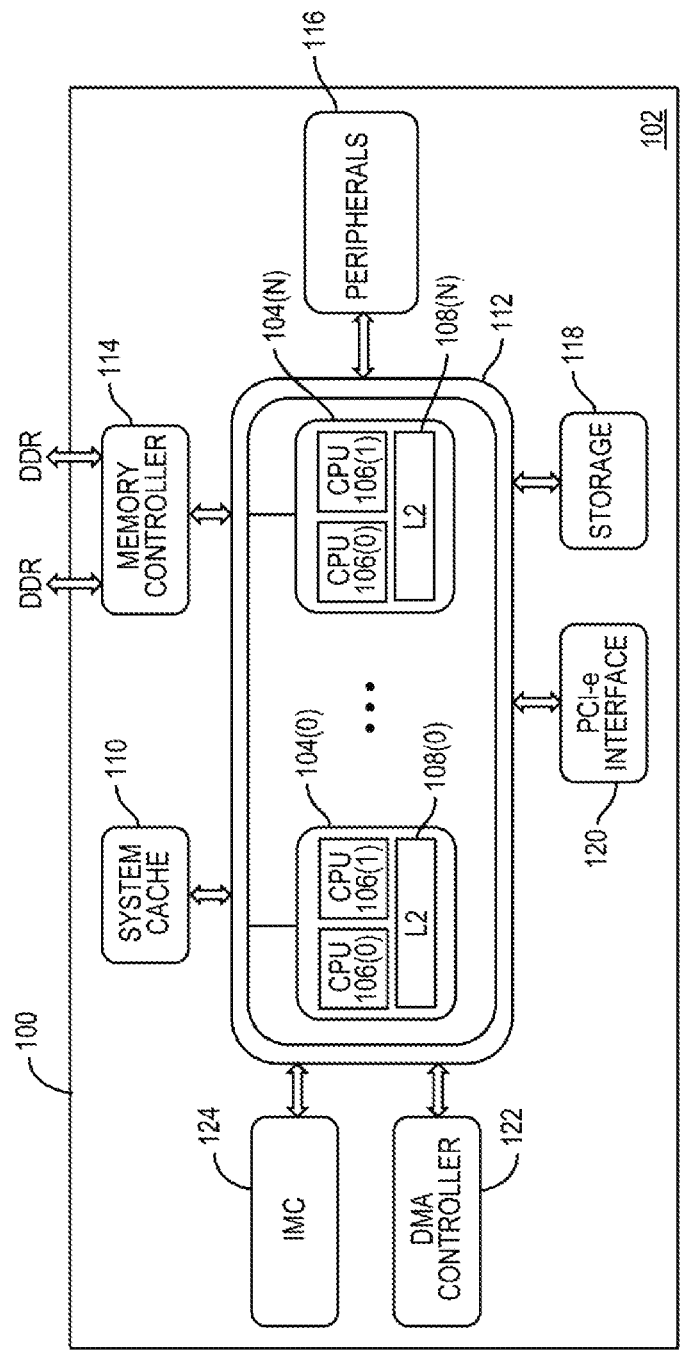
FIG. 1 is a schematic diagram of an exemplary system-on-a-chip (SoC) that includes a central processing unit (CPU)-based system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 2:
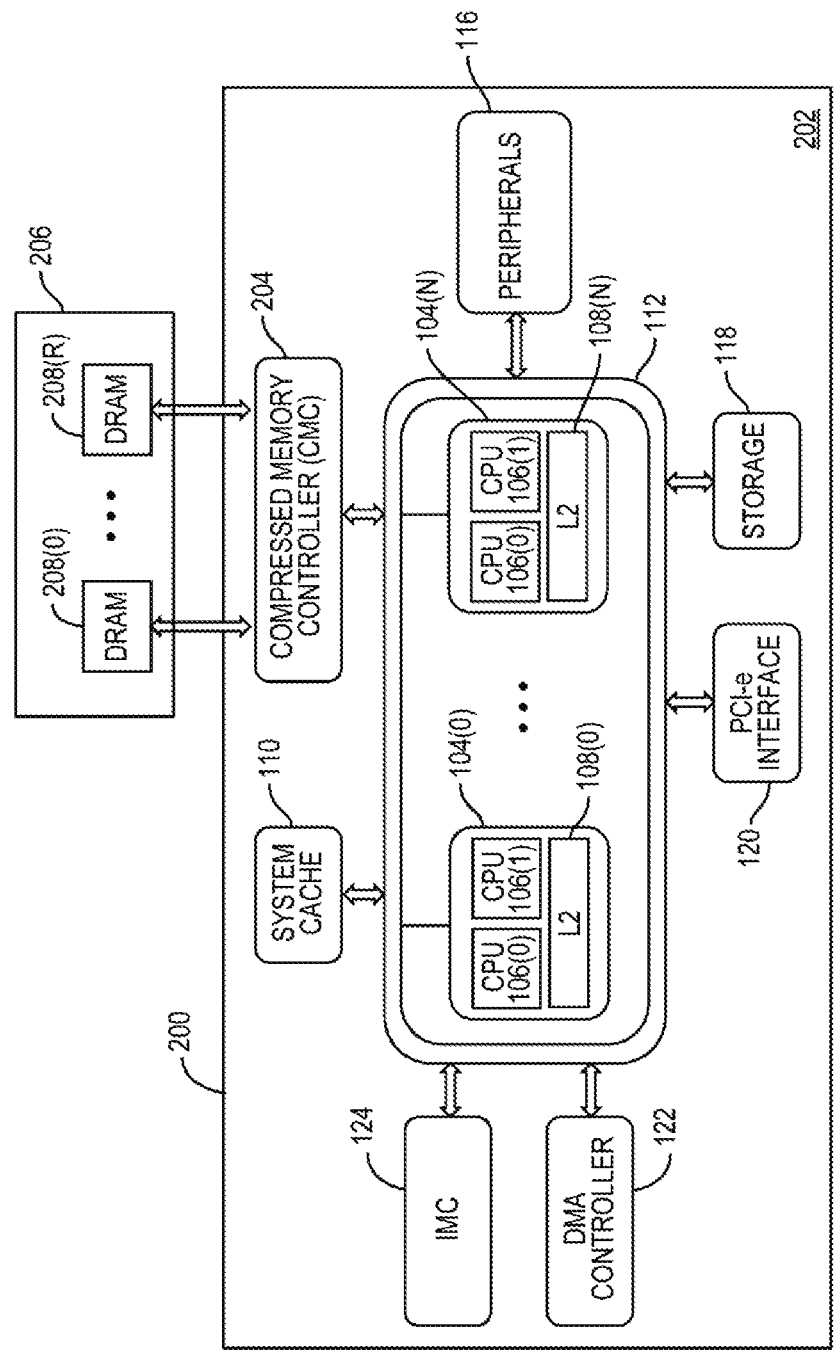
FIG. 2 is a schematic diagram of an SoC that includes an exemplary CPU-based system having a plurality of CPUs and a compressed memory controller (CMC) configured to provide memory bandwidth compression.

Aspects disclosed herein include providing memory bandwidth compression using multiple last-level cache (LLC) lines in a central processing unit (CPU)-based system. In some aspects, a compressed memory controller (CMC) is configured to provide memory bandwidth compression for memory read requests and/or memory write requests. In this regard, FIG. 2 is a schematic diagram of a system-on-a-chip (SoC) 200 that includes a CPU-based system 202 having a plurality of CPU blocks 104(0)-104(N) similar to the CPU-based system 102 in FIG. 1. The CPU-based system 202 in FIG. 2 includes some common components with the CPU-based system 102 in FIG. 1, which are noted by common element numbers between FIGS. 1 and 2. For the sake of brevity, these elements will not be re-described. However, in the CPU-based system 202 in FIG. 2, a CMC 204 is provided. The CMC 204 controls access to a system memory 206. The system memory 206 may comprise one or more double data rate (DDR) dynamic random access memories (DRAMs) 208(0)-208(R) (referred to hereinafter as "DRAM 208(0)-208(R)"), as a non-limiting example. The CMC 204 in this example employs memory bandwidth compression according to the aspects disclosed herein and below. Similar to the memory controller 114 of the CPU-based system 102 of FIG. 1, the CMC 204 in the CPU-based system 202 in FIG. 2 is shared by the CPU blocks 104(0)-104(N) through the internal system bus 112.

Figure 3:
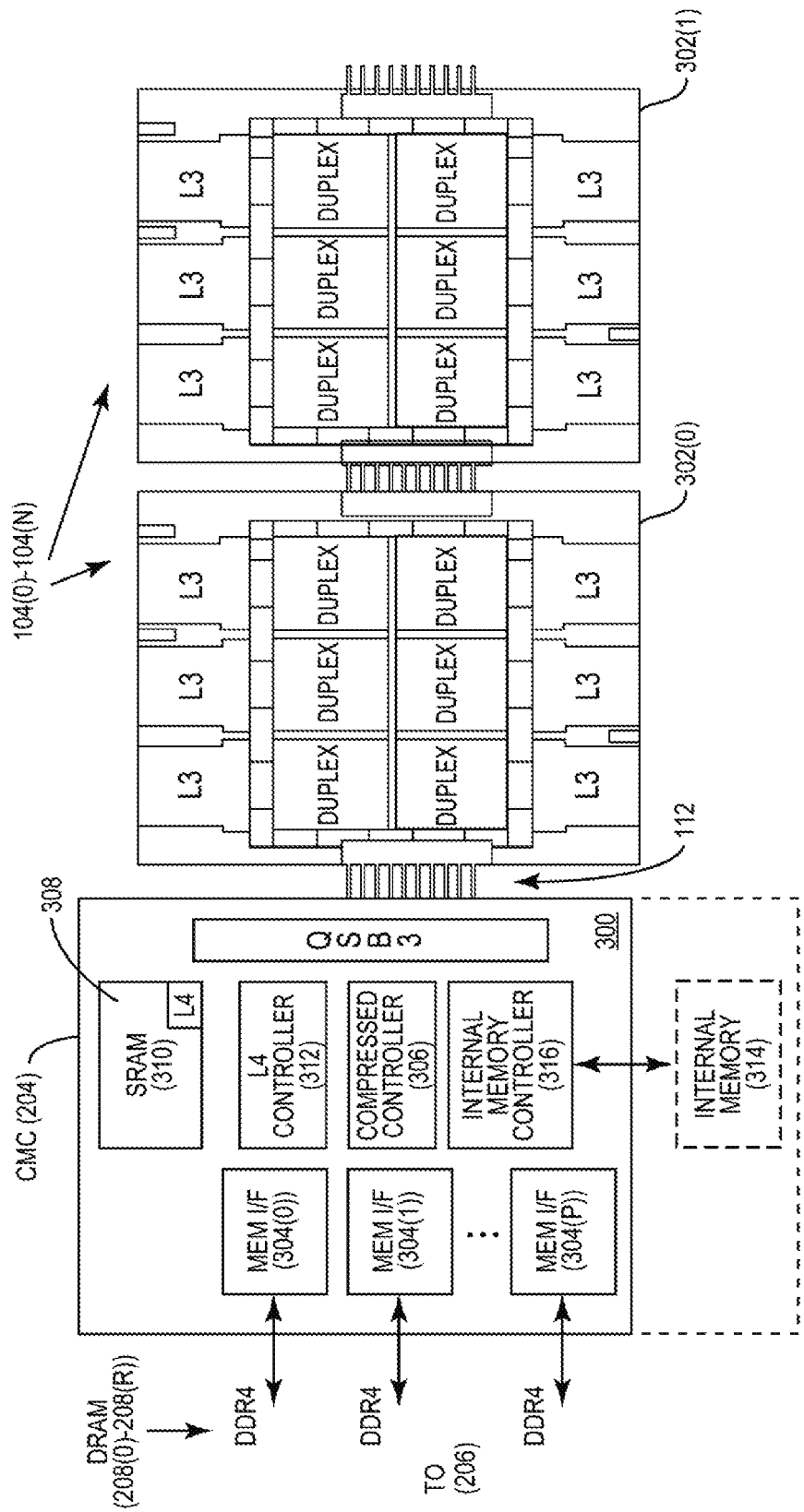
FIG. 3 is a more detailed schematic diagram of the CMC of FIG. 2, wherein the CMC is further communicatively coupled to an optional, internal memory that may be employed to provide memory bandwidth compression.

To illustrate, a more detailed schematic diagram of exemplary internal components of the CMC 204 in FIG. 2 is provided in FIG. 3. In this example, the CMC 204 is provided on a separate semiconductor die 300 from semiconductor dies 302(0), 302(1) that contain the CPU blocks 104(0)-104(N) in FIG. 2. Alternatively, in some aspects the CMC 204 may be included in a common semiconductor die (not shown) with the CPU blocks 104(0)-104(N). Regardless of the die configurations, the CMC 204 is provided such that the CPU blocks 104(0)-104(N) may make memory access requests via the internal system bus 112 to the CMC 204, and receive data from memory through the CMC 204.

With continuing reference to FIG. 3, the CMC 204 controls operations for memory accesses to the system memory 206, which is shown in FIGS. 2 and 3 as comprising DRAM 208(0)-208(R). The CMC 204 includes a plurality of memory interfaces (MEM I/Fs) 304(0)-304(P) (e.g., DDR DRAM interfaces) used to service memory access requests (not shown). In this regard, the CMC 204 in this example includes a compression controller 306. The compression controller 306 controls the compression of data stored to the system memory 206 and the decompression of data retrieved from the system memory 206 in response to memory access requests from the CPU blocks 104(0)-104(N). The compression controller 306 can also be configured to perform bandwidth compression of information provided over the internal system bus 112 to the CPU blocks 104(0)-104(N).

As will be discussed in more detail below, the compression controller 306 can perform any number of compression techniques and algorithms to provide memory bandwidth compression. A local memory 308 is provided for data structures and other information needed by the compression controller 306 to perform such compression techniques and algorithms. In this regard, the local memory 308 is provided in the form of a static random access memory (SRAM) 310. The local memory 308 is of sufficient size to be used for data structures and other data storage that may be needed for the compression controller 306 to perform compression techniques and algorithms. The local memory 308 may also be partitioned to contain a cache, such as a Level 4 (L4) cache, to provide additional cache memory for internal use within the CMC 204. Thus, an L4 controller 312 may also be provided in the CMC 204 to provide access to the L4 cache. Enhanced compression techniques and algorithms may require a larger internal memory. For example, the local memory 308 may provide 128 kilobytes (kB) of memory.

Further, as shown in FIG. 3, an optional, additional internal memory 314 can also be provided for the CMC 204. The additional internal memory 314 may be provided as DRAM, as an example. The additional internal memory 314 can facilitate additional or greater amounts of storage of data structures and other data than in the local memory 308 for the CMC 204 providing memory bandwidth compression and decompression mechanisms to increase the memory bandwidth compression of the CPU-based system 202. An internal memory controller 316 is provided in the CMC 204 to control memory accesses to the additional internal memory 314 for use in compression. The internal memory controller 316 is not accessible or viewable to the CPU blocks 104(0)-104(N).

As noted above, the CMC 204 in FIG. 3 may perform memory bandwidth compression, including, in some aspects, zero-line compression. The local memory 308 can be used to store larger data structures used for such compression. As discussed in greater detail below, memory bandwidth compression may reduce memory access latency and allow more CPUs 106(0), 106(1) or their respective threads to access a same number of memory channels while minimizing the impact to memory access latency. In some aspects, the number of memory channels may be reduced while achieving similar latency results compared to a greater number of memory channels if such compression was not performed by the CMC 204, which may result in reduced system level power consumption.

Each of the resources provided for memory bandwidth compression in the CMC 204 in FIG. 3, including the local memory 308 and the additional internal memory 314, can be used individually or in conjunction with each other to achieve the desired balance among resources and area, power consumption, increased memory capacity through memory capacity compression, and increased performance through memory bandwidth compression. Memory bandwidth compression can be enabled or disabled, as desired. Further, the resources described above for use by the CMC 204 can be enabled or disabled to achieve the desired tradeoffs among memory capacity and/or bandwidth compression efficiency, power consumption, and performance. Exemplary memory bandwidth compression techniques using these resources available to the CMC 204 will now be discussed.

Figure 4:
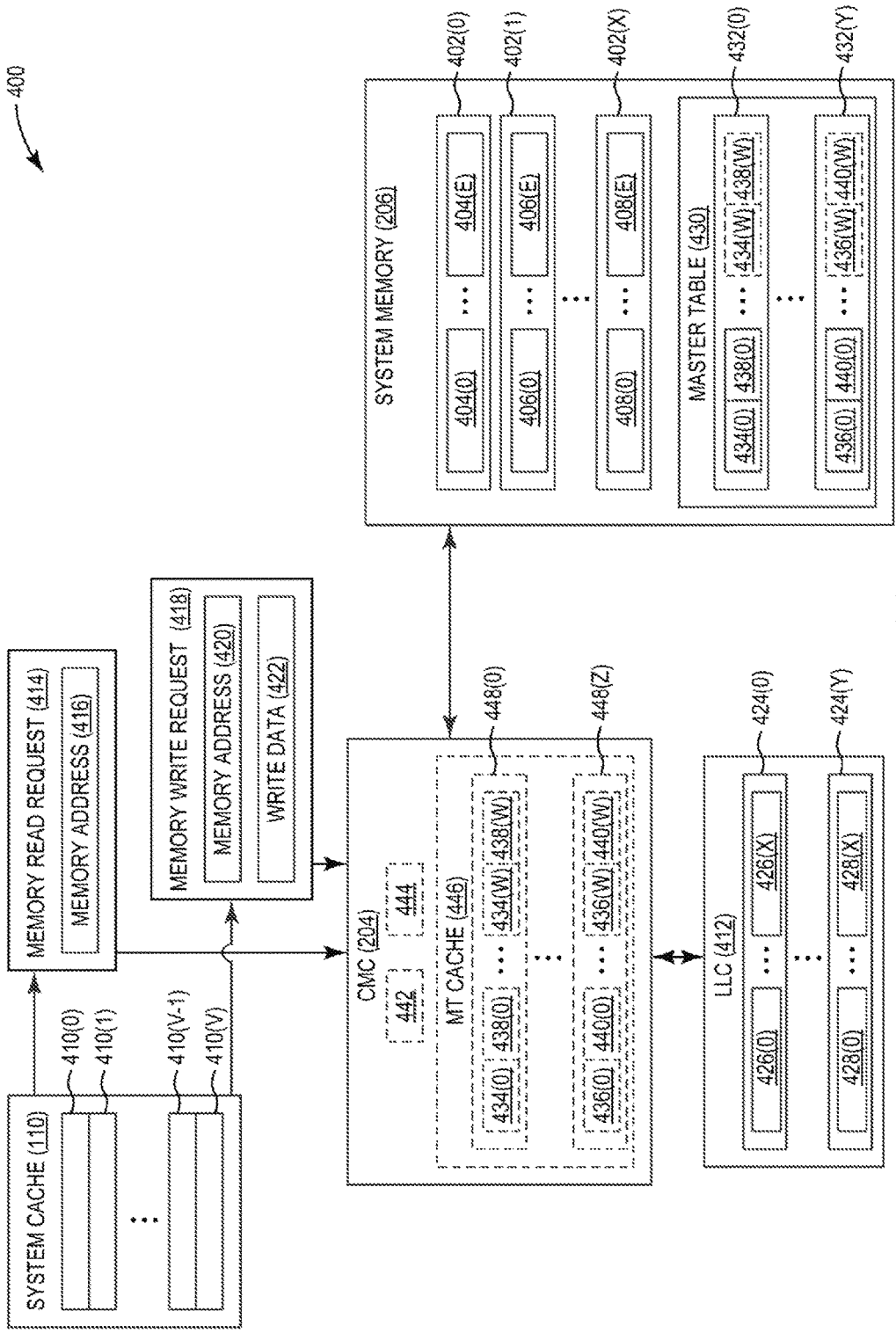
FIG. 4 is a diagram illustrating an exemplary memory bandwidth compression mechanism that may be implemented by the CMC of FIGS. 2 and 3 for providing memory bandwidth compression.

In this regard, FIG. 4 illustrates an exemplary memory bandwidth compression mechanism 400 that can be implemented by the CMC 204 of FIGS. 2 and 3 to provide memory bandwidth compression. In the memory bandwidth compression mechanism 400, the system memory 206 includes a plurality of memory granules 402(0)-402(X) for storing compressed data. The size of each of the memory granules 402(0)-402(X) represents the memory read/write granularity of the system memory 206 (i.e., a smallest amount of data that may be read from the system memory 206 in a memory read operation or written to the system memory 206 in a memory write operation). For example, in some exemplary memory architectures, each of the memory granules 402(0)-402(X) may comprise 64 bytes of data. Compressed data may be stored in blocks 404(0)-404(E), 406(0)-406(E), and 408(0)-408(E) within the memory granules 402(0)-402(X). Each of the blocks 404(0)-404(E), 406(0)-406(E), and 408(0)-408(E) has a size that is smaller than the memory read/write granularity of the system memory 206. In the example above, each of the memory granules 402(0)-402(X) comprises 64 bytes of data, and each of the blocks 404(0)-404(E), 406(0)-406(E), and 408(0)-408(E) may comprise 32 bytes of data.

Some aspects may provide that each of the memory granules 402(0)-402(X) may comprise more or fewer bytes of data (e.g., 256 bytes or 64 bytes, as non-limiting examples). Similarly, according to some aspects, the blocks 404(0)-404(E), 406(0)-406(E), 408(0)-408(E) within the memory granules 402(0)-402(X) may be larger or smaller (e.g., 128 bytes or 16 bytes, as non-limiting examples), depending on the capabilities of the compression mechanism utilized. In some aspects, a memory read operation may read fewer bytes than the size of each of the memory granules 402(0)-402(X) (e.g., one of the blocks 404(0)-404(E), 406 (0)-406(E), 408(0)-408(E)), but still consume the same amount of memory bandwidth as one of the memory granules 402(0)-402(X).

The memory bandwidth compression mechanism 400 further provides the system cache 110, which comprises a plurality of system cache lines 410(0)-410(V). Each of the plurality of system cache lines 410(0)-410(V) may be sized to store the contents of multiple memory granules 402(0)-402(X) of the system memory 206. For example, in aspects in which the memory granules 402(0)-402(X) are 64 bytes in size, each of the plurality of system cache lines 410(0)-410(V) may be 128 bytes in size.

To provide memory bandwidth compression, the CMC 204 is communicatively coupled to an LLC 412 (e.g., a Level 4 (L4) cache) that is used for translating memory read operations, (such as a memory read request 414 from a memory address 416) and memory write operations (such as a memory write request 418 to store write data 420 to a memory address 422) between the system cache 110 and the system memory 206. The LLC 412 comprises a plurality of LLC lines 424(0)-424(Y). Each of the plurality of LLC lines 424(0)-424(Y) is made up of a plurality of sub-lines, such as sub-lines 426(0)-426(X) of the LLC line 424(0) and sublines 428(0)-428(X) of the LLC line 424(Y). In some aspects, the plurality of LLC lines 424(0)-424(Y) each may include two (2) sub-lines 426(0)-426(X), 428(0)-428(X). Some aspects may provide that the number of sub-lines 426(0)-426(X), 428(0)-428(X) within the plurality of LLC lines 424(0)-424(Y) is a power of two (2). The size of each of the sub-lines 426(0)-426(X), 428(0)-428(X) corresponds to the size of each of the plurality of system cache lines 410(0)-410(V). Thus, for example, if the size of the system cache lines 410(0)-410(V) is 128 bytes, an LLC line 424 (0)-424(Y) containing two (2) sub-lines 426(0)-426(X), 428(0)-428(X) is 256 bytes in size.

As discussed in greater detail below, the CMC 204 may provide memory bandwidth compression by compressing and storing data for each of the LLC lines 424(0)-424(Y) in the system memory 206 upon eviction of the LLC lines 424(0)-424(Y) from the LLC 412. Because each of the LLC lines 424(0)-424(Y) includes the sub-lines 426(0)-426(X), 428(0)-428(X) corresponding to multiple system cache lines 410(0)-410(V) of the system cache 110, the data for the multiple system cache lines 410(0)-410(V) may be compressed and written to the system memory 206. In some aspects, as a non-limiting example, the data for the multiple system cache lines 410(0)-410(V) optionally may be compressed simultaneously and written together to the system memory 206, and/or may be read together and decompressed simultaneously.

Due to the memory read/write granularity of the system memory 206, a subsequent read of the compressed data for a particular one of the sub-lines 426(0)-426(X), 428(0)-428 (X) may also return data for the other sub-lines 426(0)-426 (X), 428(0)-428(X) within the same LLC line 424(0)-424 (Y). This may effectively provide prefetching of all or part of the data within the other sub-lines 426(0)-426(X), 428 (0)-428(X) within the same LLC line 424(0)-424(Y) without consuming as much bandwidth as reading the other sub-lines 426(0)-426(X), 428(0)-428(X) in a separate memory read operation.

The system memory 206 also includes a master table 430, which includes multiple master table entries 432(0)-432(Y). Each of the master table entries 432(0)-432(Y) is the same size as the memory granules 402(0)-402(X). In the example of FIG. 4, the master table entries 432(0)-432(Y) store offset values 434(0)-434(W), 436(0)-436(W) and length values 438(0)-438(W), 440(0)-440(W) for each of the sub-lines 426(0)-426(X), 428(0)-428(X) for which compressed data is stored in the blocks 404(0)-404(E), 406(0)-406(E), 408(0)-408(E) in the system memory 206. It is to be understood that the number of offset values 434(0)-434(W), 436(0)-436(W) and length values 438(0)-438(W), 440(0)-440(W) in some aspects may be greater or fewer than illustrated in FIG. 4. The offset values 434(0)-434(W), 436(0)-436(W) are used by the CMC 204 to determine where compressed data for a particular sub-line 426(0)-426(X), 428(0)-428(X) is located relative to the start of the memory line region of memory in the system memory 206 corresponding to the LLC line 424(0)-424(Y) that was compressed. The length values 438(0)-438(W), 440(0)-440(W) are used by the CMC 204 to determine a number of the blocks 404(0)-404(E), 406(0)-406(E), 408(0)-408(E) in which the compressed data for the sub-lines 426(0)-426(X), 428(0)-428(X) is stored. Together, the offset values 434(0)-434(W), 436(0)-436(W) and the length values 438(0)-438(W), 440(0)-440(W) may be used by the CMC 204 to determine which and how many of the blocks 404(0)-404(E), 406(0)-406(E), 408(0)-408(E) to access for a memory operation on the compressed data for the sub-line 426(0)-426(X), 428(0)-428(X) in the system memory 206. In some aspects, one or more of the length values 438(0)-438(W), 440(0)-440(W) may represent an encoding indicating that a corresponding sub-line 426(0)-426(X), 428(0)-428(X) contains a specified pattern. As a non-limiting example, a length value 438(0)-438(W), 440(0)-440(W) having the value zero (0) may indicate that the corresponding sub-line 426(0)-426(X), 428(0)-428(X) contains all zeroes (0), and thus the CMC 204 may avoid an unnecessary read or write to memory.

As discussed in greater detail below, the CMC 204 may generate the offset values 434(0)-434(W), 436(0)-436(W) using one or more allocation rules to increase the possibility of sub-line pre-fetching. When compressing data for storage in the system memory 206, some aspects of the CMC 204 may generate an updated offset value 442 and/or an updated length value 444. If data is already stored at the location to be written in the system memory 206, the CMC 204 may determine how to store the compressed data in the system memory 206 by comparing the updated length value 444 with one of the length values 438(0)-438(W), 440(0)-440(W).

In some aspects, the CMC 204 may further include a master table (MT) cache 446 comprising master table (MT) cache entries 448(0)-448(Z) for caching a subset of the master table entries 432(0)-432(Y) of the master table 430. Using the MT cache 446, the CMC 204 may reduce memory access latency that may be incurred by reading the master table 430 in the system memory 206.

To illustrate the effects of exemplary allocation rules that may be applied by the CMC 204 of FIG. 4 to ensure efficient use of the system memory 206 for storing compressed data, FIG. 5 is provided. The CMC 204 may apply one or more allocation rules when generating an offset value, such as the offset value 434(0), for compressed data (i.e., when determining where compressed data should be stored within the memory line region of memory in the system memory 206 corresponding to the LLC line 424(0) that was compressed). By applying allocation rules, the CMC 204 may maximize the possibility of pre-fetching multiple sub-lines 426(0)-426(X), 428(0)-428(X) with one (1) or more memory read operations. In some aspects, the one or more allocation rules may be used to pre-generate an allocation table (not shown) that indicates where an updated compressed data block for a sub-line, such as the sub-line 426(0), can be optimally stored in the system memory 206 with compressed data for another existing sub-line such as the subline 426(X) with a given data position and size.

In some aspects, the one or more allocation rules may include preventing compressed data from straddling memory sub-line regions of the system memory 206 corresponding to more than one sub-line. For example, in FIG. 5, two (2) adjacent memory sub-line regions 500(0) and 500(1) of the system memory 206, each of which is the same size as the sub-lines 426(0)-426(X), 428(0)-428(X) of the LLC 412, may be used to store compressed data 502. However, the compressed data 502 as shown in FIG. 5 is positioned such that it straddles the memory sub-line regions 500(0), 500(1), and would require reading both of the memory sub-line regions 500(0), 500(1) to retrieve the compressed data 502. Accordingly, as indicated by element 504, the positioning of the compressed data 502 would violate the allocation rule regarding straddling.

Some aspects may provide that the one or more allocation rules include aligning compressed data within memory sub-line regions of the system memory 206. As seen in FIG. 5, memory sub-line regions 506(0) and 506(1) store compressed data 508. The compressed data 508 in this example is aligned with the start of the memory sub-line region 506(0). In contrast, memory sub-line regions 510(0) and 510(1) store compressed data 512, which is not aligned with either the start or the end of the memory sub-line region 510(0). Thus, as indicated by element 514, the positioning of the compressed data 512 would violate the allocation rule regarding alignment.

According to some aspects, the one or more allocation rules may include grouping compressed data for a plurality of sub-lines. For example, odd-length blocks of compressed data should be placed together within a memory sub-line region if possible in order to increase the chances of being able to pre-fetch data. In FIG. 5, for example, memory sub-line regions 516(0) and 516(1) store compressed data 518 and 520. The compressed data 518 and 520 are both stored within the memory sub-line region 516(0), thus allowing both to be read with a single memory read operation. In contrast, in memory sub-line regions 522(0) and 522(1), the compressed data 518 and 520 are not grouped. As a result, an opportunity for pre-fetching may be missed. Accordingly, as indicated by element 524, the positioning of the compressed data 518 and 520 within the memory sub-line regions 522(0) and 522(1) would violate the allocation rule regarding grouping.

Figure 6A:
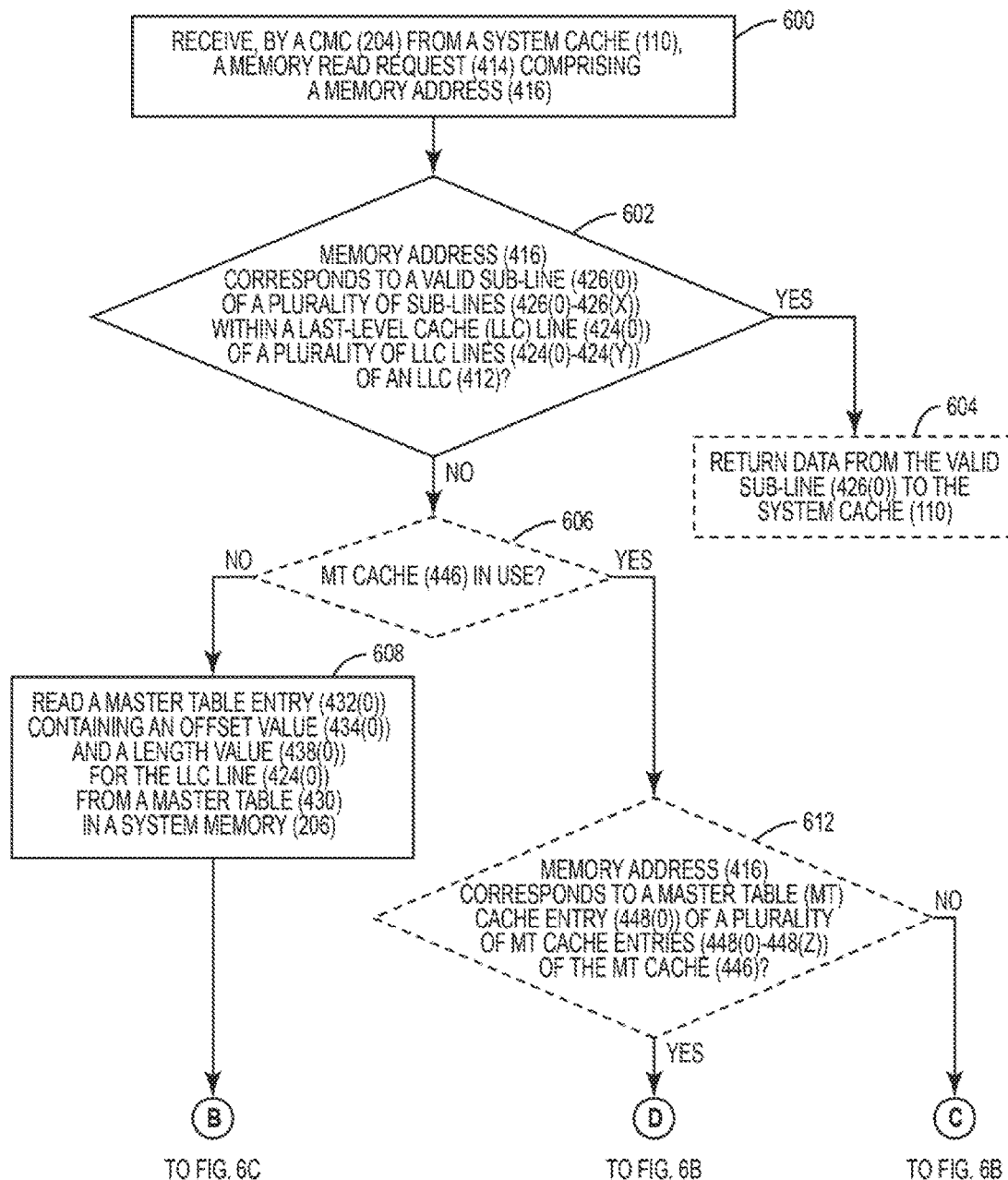
FIGS. 6A-6E are flowcharts illustrating exemplary operations for performing a memory read operation by the CMC of FIG. 2 using memory bandwidth compression.

FIGS. 6A-6E are flowcharts illustrating exemplary operations for performing a memory read operation by the CMC 204 of FIG. 4 using memory bandwidth compression. For the sake of clarity, elements of FIG. 4 are referenced in describing FIGS. 6A-6E. In FIG. 6A, operations begin with the CMC 204 receiving the memory read request 414 comprising the memory address 416 from the system cache 110 (block 600). In this regard, the CMC 204 may be referred to herein as "a means for receiving, from a system cache, a memory read request comprising a memory address." The CMC 204 determines whether the memory address 416 corresponds to a valid sub-line 426(0) of the plurality of sub-lines 426(0)-426(X) within the LLC line 424(0) of the plurality of LLC lines 424(0)-424(Y) of an LLC 412 (block 602). Accordingly, the CMC 204 may be referred to herein as "a means for determining whether the memory address corresponds to a valid sub-line of a plurality of sub-lines within an LLC line of a plurality of LLC lines of an LLC." In some aspects, determining whether the memory address 416 corresponds to a valid sub-line 426(0) may be accomplished by the CMC 204 determining whether the memory address 416 corresponds to a sub-line 426(0) of an existing LLC line 424(0) within the plurality of LLC lines 424(0)-424(Y), and, if so, whether the sub-line 426(0) of the existing LLC line 424(0) is valid.

In some aspects, if the CMC 204 determines at decision block 602 that the memory address 416 corresponds to a valid sub-line 426(0) (i.e., a cache hit on the LLC 412), the CMC 204 returns data from the valid sub-line 426(0) to the system cache 110 (block 604). If the memory address 416 is determined to not correspond to a valid sub-line 426(0) (e.g., because the memory address 416 does not correspond to an existing LLC line 424(0), or the sub-line 426(0) to which the memory address 416 corresponds is invalid), the CMC 204 in some aspects next determines whether the MT cache 446 is in use (block 606). If the MT cache 446 is not in use, the CMC 204 reads the master table entry 432(0) containing the offset value 434(0) and the length value 438(0) for the LLC line 424(0) from the master table 430 in the system memory 206 (block 608). The CMC 204 thus may be referred to herein as "a means for reading a master table entry containing an offset value and a length value for the LLC line from a master table in a system memory, responsive to determining that the memory address does not correspond to a valid sub-line of the plurality of sub-lines within an LLC line of the plurality of LLC lines of the LLC." Processing then resumes at block 610 in FIG. 6C.

In some aspects, if the CMC 204 determines at decision block 606 that the MT cache 446 is in use, the CMC 204 determines whether the memory address 416 corresponds to an MT cache entry 448(0) of the plurality of MT cache entries 448(0)-448(Z) of the MT cache 446 (block 612). If not (i.e., a cache miss on the MT cache 446), processing resumes at block 614 of FIG. 6B. However, if the CMC 204 determines at decision block 612 that the memory address 416 does correspond to the MT cache entry 448(0) (i.e., a cache miss on the MT cache 446), processing continues at block 616 of FIG. 6B.

Figure 6B:
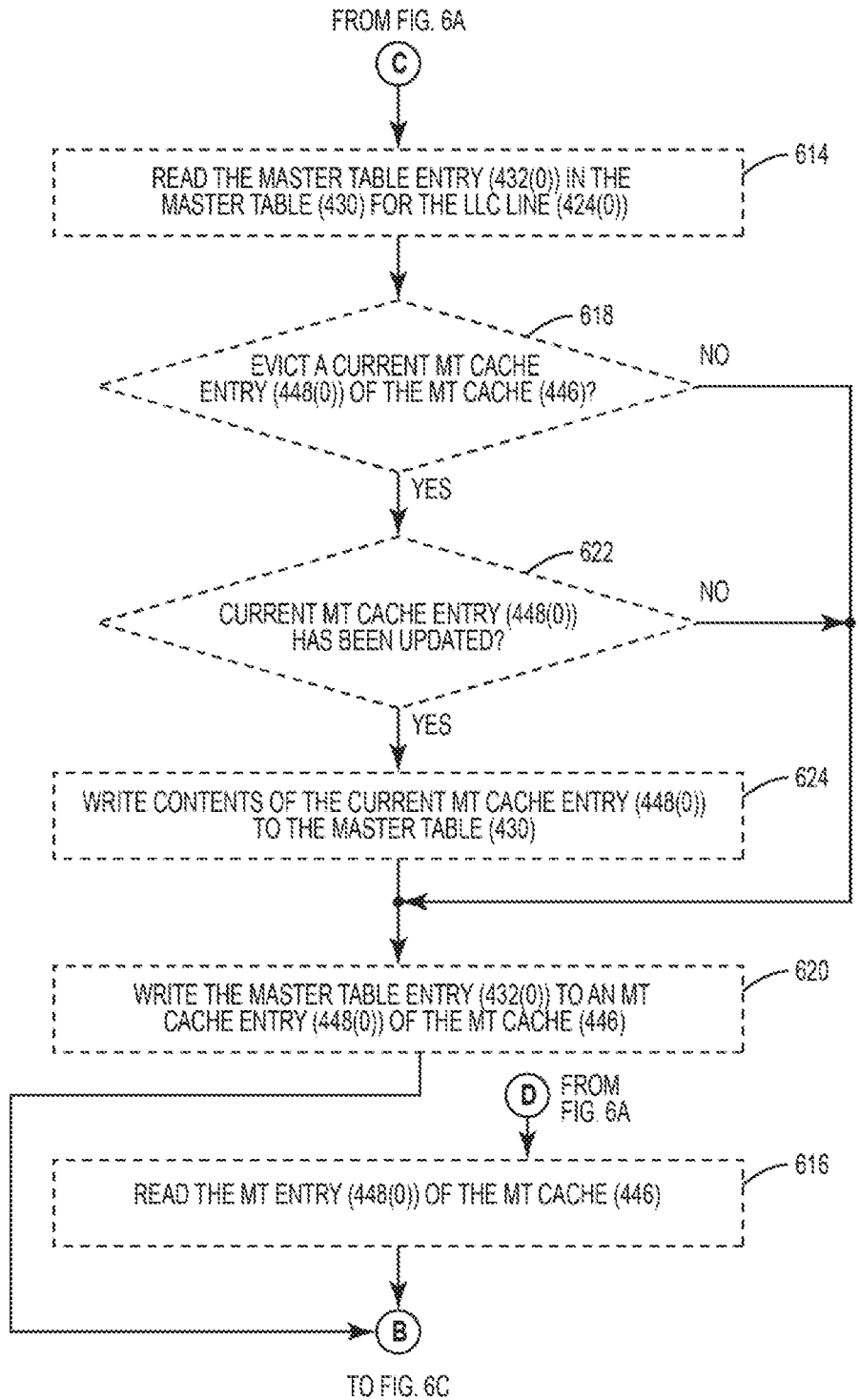

Reference is now made to FIG. 6B. It is to be understood that, in some aspects, one or more of the operations illustrated in FIG. 6B may be executed in parallel, and/or may be executed in an order other than shown in FIG. 6B. As seen in FIG. 6B, in response to a cache miss on the MT cache 446, the CMC 204 reads a master table entry, such as the master table entry 432(0), in the master table 430 for the LLC line 424(0) (block 614). The CMC 204 may determine whether to evict a current MT cache entry 448(0) of the MT cache 446 (block 618). If not, processing resumes at block 620 of FIG. 6B. However, if the CMC 204 determines at decision block 618 that the current MT cache entry 448(0) should be evicted, the CMC 204 determines whether the current MT cache entry 448(0) has been updated (e.g., by checking a dirty bit for the current MT cache entry 448(0)) (block 622). If the current MT cache entry 448(0) has not been updated, processing resumes at block 620 of FIG. 6B. If the CMC 204 determines at decision block 622 that the current MT cache entry 448(0) has been updated, the CMC 204 writes contents of the current MT cache entry 448(0) to the master table 430 (block 624). The CMC 204 then writes the master table entry 432(0) that was read in block 614 of FIG. 6B to an MT cache entry 448(0) of the MT cache 446 (block 620). Processing then resumes at block 610 of FIG. 6C. If the CMC 204 determines at decision block 612 of FIG. 6A that the memory address 416 does correspond to an MT cache entry 448(0) of the plurality of MT cache entries 448(0)-448(Z) of the MT cache 446, the CMC 204 reads the MT cache entry 448(0) of the MT cache 446 (block 616). Processing then resumes at block 610 of FIG. 6C.

Figure 6C:
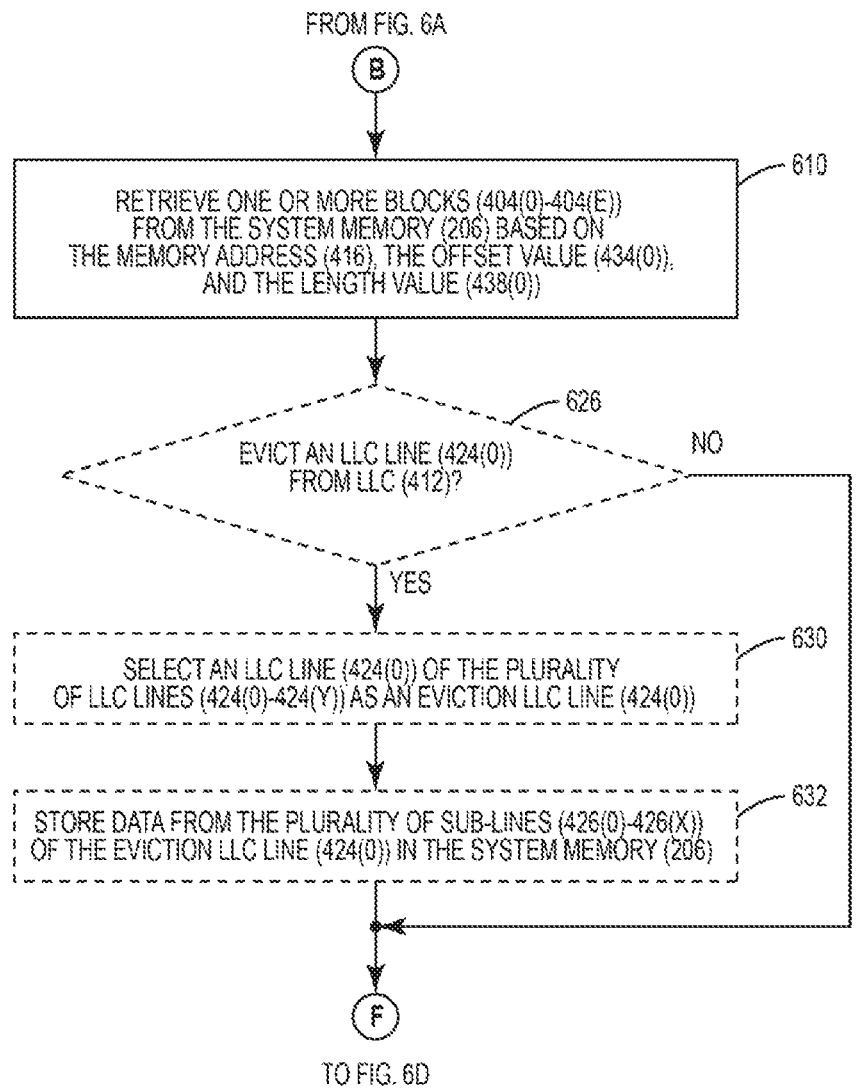

Turning now to FIG. 6C, the CMC 204 next retrieves one or more blocks 404(0)-404(E) from the system memory 206 based on the memory address 416, the offset value 434(0), and the length value 438(0) (block 610). In this regard, the CMC 204 may be referred to herein as "a means for retrieving one or more blocks from the system memory based on the memory address, the offset value, and the length value." Some aspects may provide that the CMC 204 may then determine whether to evict an LLC line 424(0) from the LLC 412 (e.g., to store the data read from the system memory 206 in the LLC 412) (block 626). If the CMC 204 determines at decision block 626 not to evict an LLC line 424(0), processing resumes at block 628 of FIG. 6D. However, if the CMC 204 determines that an LLC line 424(0) should be evicted, the CMC 204 selects the LLC line 424(0) of the plurality of LLC lines 424(0)-424(Y) as an eviction LLC line 424(0) (block 630). The CMC 204 then stores data from the plurality of sub-lines 426(0)-426(X) of the eviction LLC line 424(0) in the system memory 206 (block 632). Accordingly, the CMC 204 may be referred to herein as "a means for storing data from the retrieved one or more blocks in a sub-line of the plurality of sub-lines within an LLC line of the plurality of LLC lines of the LLC." In some aspects, the CMC 204 may store data from the plurality of sub-lines 426(0)-426(X) of the eviction LLC line 424(0) in the system memory 206 responsive to determining that the data from the plurality of sub-lines 426(0)-426(X) has been modified. As a non-limiting example, the CMC 204 may consult one or more dirty indicators (not shown) associated with the plurality of sub-lines 426(0)-426(X) to determine whether the data stored therein has been modified. Processing continues at block 628 of FIG. 6D.

Figure 6D:
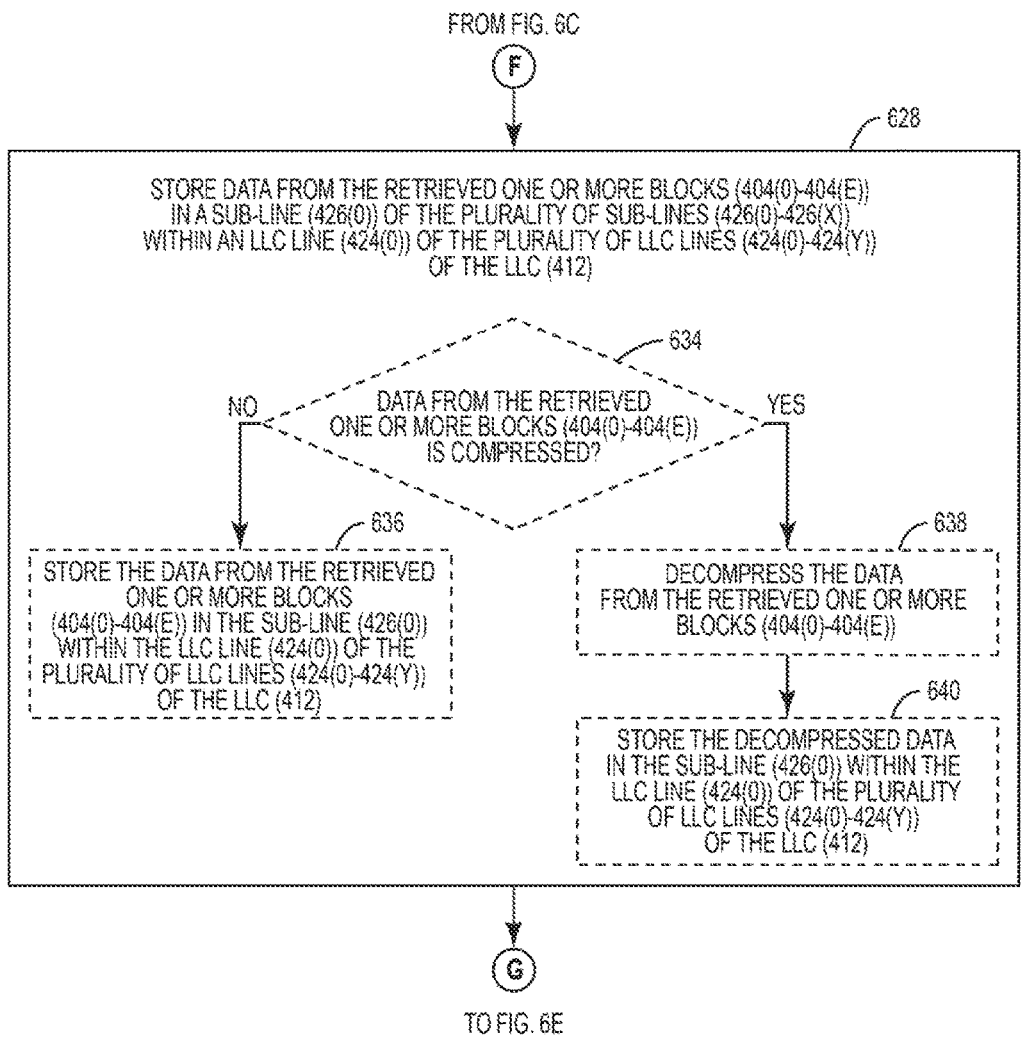

In some aspects, one or more of the operations illustrated in FIG. 6D may be executed in parallel, and/or may be executed in an order other than shown in FIG. 6D. As seen in FIG. 6D, the CMC 204 next stores data from the retrieved one or more blocks 404(0)-404(E) in a sub-line 426(0) of the plurality of sub-lines 426(0)-426(X) within an LLC line 424(0) of the plurality of LLC lines 424(0)-424(Y) of the LLC 412 (block 628). In some aspects, operations of block 628 for storing data may comprise the CMC 204 first determining whether the data from the retrieved one or more blocks 404(0)-404(E) is compressed (block 634). If not, the CMC 204 stores the data from the retrieved one or more blocks 404(0)-404(E) in the sub-line 426(0) within the LLC line 424(0) of the plurality of LLC lines 424(0)-424(Y) of the LLC 412 (block 636). However, if the CMC 204 determines at decision block 634 that the data from the retrieved one or more blocks 404(0)-404(E) is compressed, the CMC 204 decompresses the data from the retrieved one or more blocks 404(0)-404(E) (block 638). The CMC 204 then stores the decompressed data in the sub-line 426(0) within the LLC line 424(0) of the plurality of LLC lines 424(0)-424(Y) of the LLC 412 (block 640). Processing then resumes at block 642 of FIG. 6E.

Figure 6E:
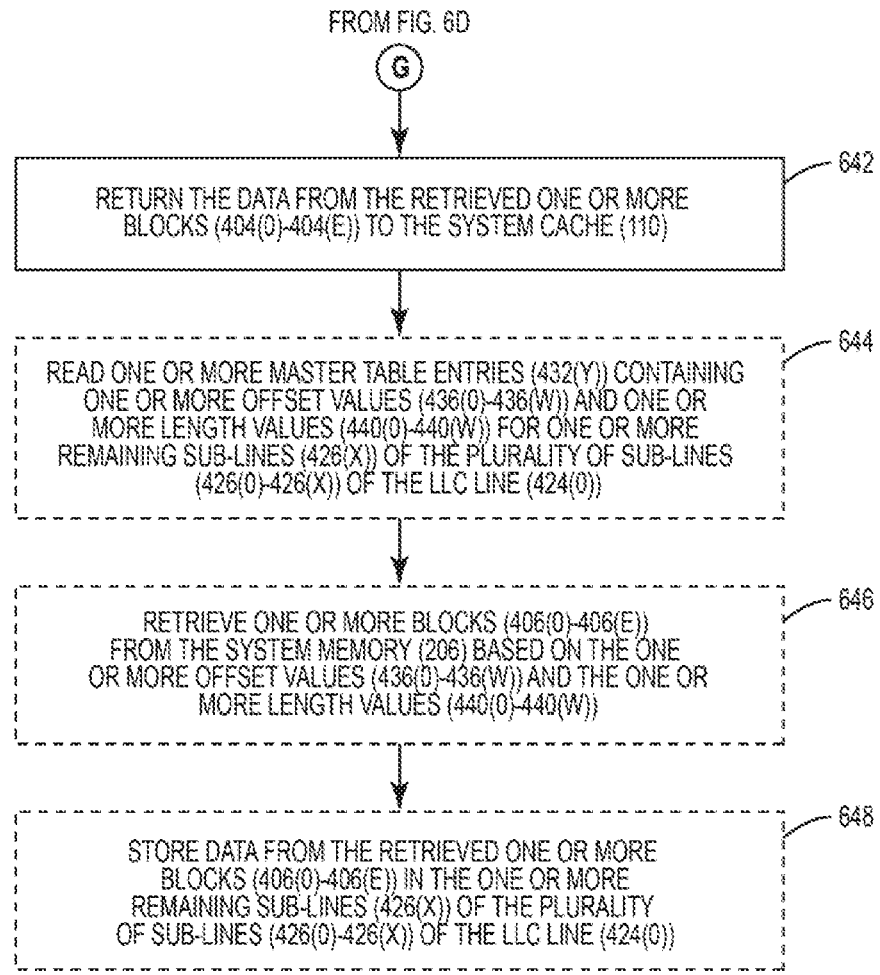

Referring now to FIG. 6E, the CMC 204 next returns the data from the retrieved one or more blocks 404(0)-404(E) to the system cache 110 (block 642). The CMC 204 thus may be referred to herein as "a means for returning the data from the retrieved one or more blocks to the system cache." Some aspects may provide that the CMC 204 further performs a "sub-line pre-fetch" to read data that is contiguous with the data from the retrieved one or more blocks 404(0)-404(E). In such aspects, the CMC 204 may read one or more master table entries 432(Y) containing one or more offset values 436(0)-436(W) and one or more length values 440(0)-440(W) for one or more remaining sub-lines 426(X) of the plurality of sub-lines 426(0)-426(X) of the LLC line 424(0) (block 644). The CMC 204 may then retrieve one or more blocks 406(0)-406(E) from the system memory 206 based on the one or more offset values 436(0)-436(W) and the one or more length values 440(0)-440(W) (block 646). The CMC 204 stores data from the retrieved one or more blocks 406(0)-406(E) in the one or more remaining sub-lines 426 (X) of the plurality of sub-lines 426(0)-426(X) of the LLC line 424(0) (block 648).

Figure 7:
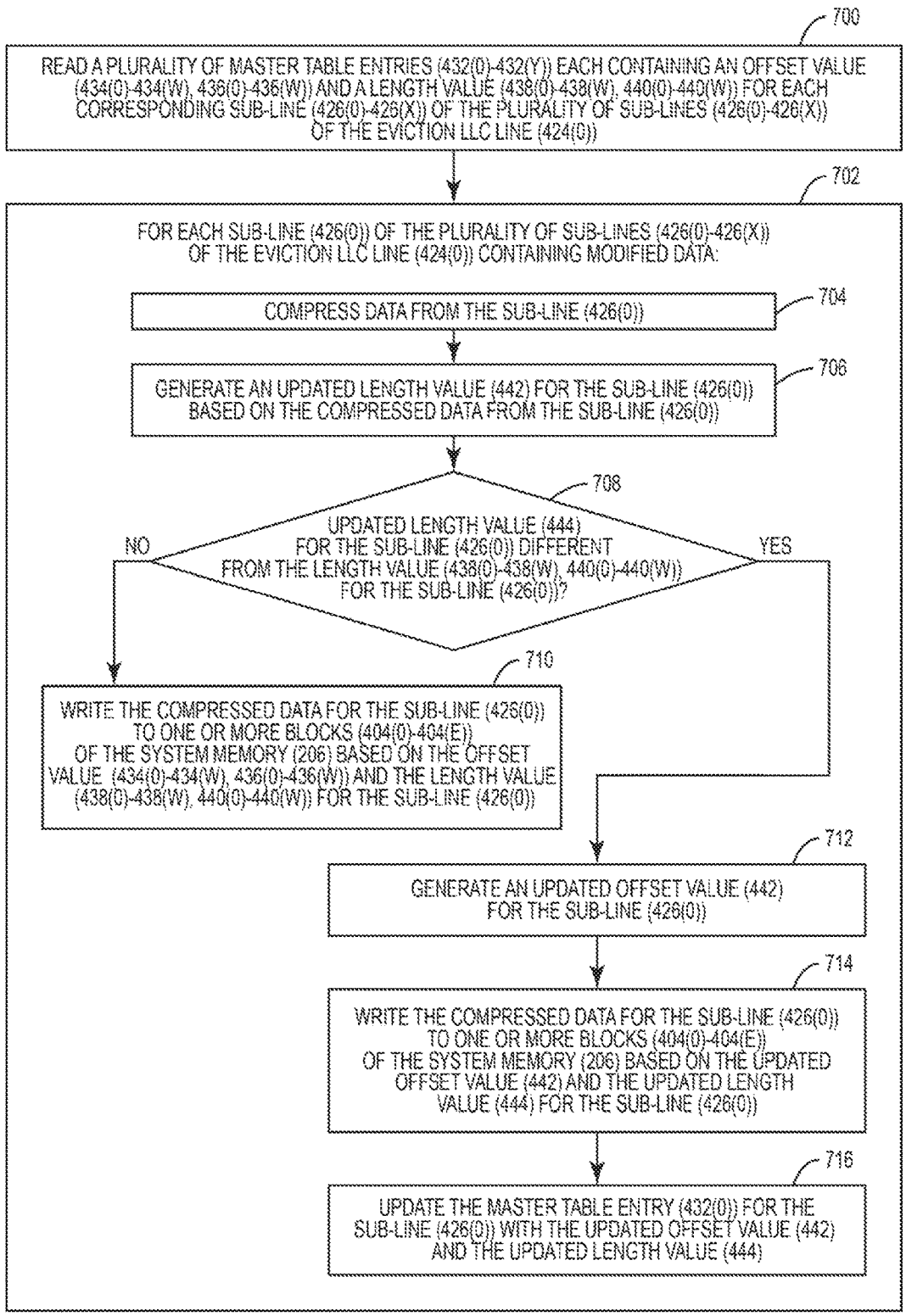
FIG. 7 is a flowchart illustrating exemplary operations for storing sub-lines of an evicted last-level cache (LLC) line in system memory by the CMC of FIG. 2 during a memory read operation.

To illustrate exemplary operations of block 632 of FIG. 6C for storing data from the plurality of sub-lines 426(0)-426(X) of the eviction LLC line 424(0) in the system memory 206 by the CMC 204 during a memory read operation, FIG. 7 is provided. Elements of FIG. 4 may be referenced in describing FIG. 7 for the sake of clarity. In FIG. 7, operations begin with the CMC 204 reading a master table entry 432(0)-432(Y) of the plurality of master table entries 432(0)-432(Y) containing an offset value 434(0)-434(W), 436(0)-436(W) and a length value 438(0)-438(W), 440(0)-440(W) for each corresponding sub-line 426(0)-426(X) of the plurality of sub-lines 426(0)-426(X) of the eviction LLC line 424(0) (block 700). The CMC 204 then carries out a series of instructions for each sub-line 426(0) of the plurality of sub-lines 426(0)-426(X) of the eviction LLC line 424(0) containing modified data (block 702). The CMC 204 first compresses data from the sub-line 426(0) (block 704). The CMC 204 then generates an updated length value 444 for the sub-line 426(0) based on the compressed data, such as the compressed data 508 of FIG. 5, from the sub-line 426(0) (block 706). The CMC 204 determines whether the updated length value 444 for the sub-line 426(0) is different from the length value 438(0)-438(W), 440(0)-440(W) for the sub-line 426(0) (block 708). If the updated length value 444 for the sub-line 426(0) is not different from the length value 438(0)-438(W), 440(0)-440(W) for the sub-line 426(0) (i.e., the compressed data is the same size as the data previously stored in the system memory 206), the CMC 204 writes the compressed data for the sub-line 426(0) to one or more blocks 404(0)-404(E) of the system memory 206 based on the offset value 434(0)-434(W), 436(0)-436 (W) and the length value 438(0)-438(W), 440(0)-440(W) for the sub-line 426(0) (block 710).

However, if the CMC 204 determines at decision block 708 that the updated length value 444 for the sub-line 426(0) is different from the length value 438(0)-438(W), 440(0)-440(W) for the sub-line 426(0), the CMC 204 generates an updated offset value 442 for the sub-line 426(0) (block 712). In some aspects, generating the updated offset value 442 may be based on one or more allocation rules as discussed above with respect to FIG. 5. The CMC 204 then writes the compressed data for the sub-line 426(0) to one or more blocks 404(0)-404(E) of the system memory 206 based on the updated offset value 442 and the updated length value 444 for the sub-line 426(0) (block 714). The CMC 204 updates the master table entry 432(0) for the sub-line 426(0) with the updated offset value 442 and the updated length value 444 (block 716).

FIGS. 8A-8D are flowcharts illustrating exemplary operations for performing a memory write operation by the CMC 204 of FIG. 4 using memory bandwidth compression. For the sake of clarity, elements of FIG. 4 are referenced in describing FIGS. 8A-8D. Operations in FIG. 8A begin with the CMC 204 receiving, from the system cache 110, the memory write request 418 comprising write data 420 and the memory address 422 (block 800). In this regard, the CMC 204 may be referred to herein as "a means for receiving, from a system cache, a memory write request comprising write data and a memory address." The CMC 204 determines whether the memory address 422 corresponds to a sub-line 426(0) of the plurality of sub-lines 426(0)-426(X) of the LLC line 424(0) of the plurality of LLC lines 424(0)-424(Y) of the LLC 412 (block 802). Accordingly, the CMC 204 may be referred to herein as "a means for determining whether the memory address corresponds to a sub-line of a plurality of sub-lines within an LLC line of a plurality of LLC lines of an LLC." If the memory address 422 corresponds to a sub-line 426(0) of the LLC line 424(0) (i.e., a hit on the LLC 412), the CMC 204 in some aspects may store the write data 420 in the sub-line 426(0) of the LLC line 424(0) (block 804).

However, if the CMC 204 determines at decision block 802 that the memory address 422 does not correspond to a sub-line 426(0) of the LLC line 424(0) (i.e., a miss on the LLC 412), the CMC 204 selects an LLC line 424(0) within the plurality of LLC lines 424(0)-424(Y) of the LLC 412 as an eviction LLC line 424(0) (block 806). The CMC 204 thus may be referred to herein as "a means for selecting an LLC line within the plurality of LLC lines of the LLC as an eviction LLC line, responsive to determining that the memory address does not correspond to a sub-line of the plurality of sub-lines within an LLC line of the plurality of LLC lines of the LLC." The CMC 204 next performs a series of operations for each sub-line 426(0) of the plurality of sub-lines 426(0)-426(X) of the eviction LLC line 424(0) containing modified data (i.e., based on a dirty flag for each of the plurality of sub-lines 426(0)-426(X)) (block 808). The CMC 204 first compresses data from the sub-line 426(0) (block 810). In this regard, the CMC 204 may be referred to herein as "a means for compressing data from each sub-line of the plurality of sub-lines of the eviction LLC line containing modified data." Processing then continues at block 812 of FIG. 8B.

Figure 8A:
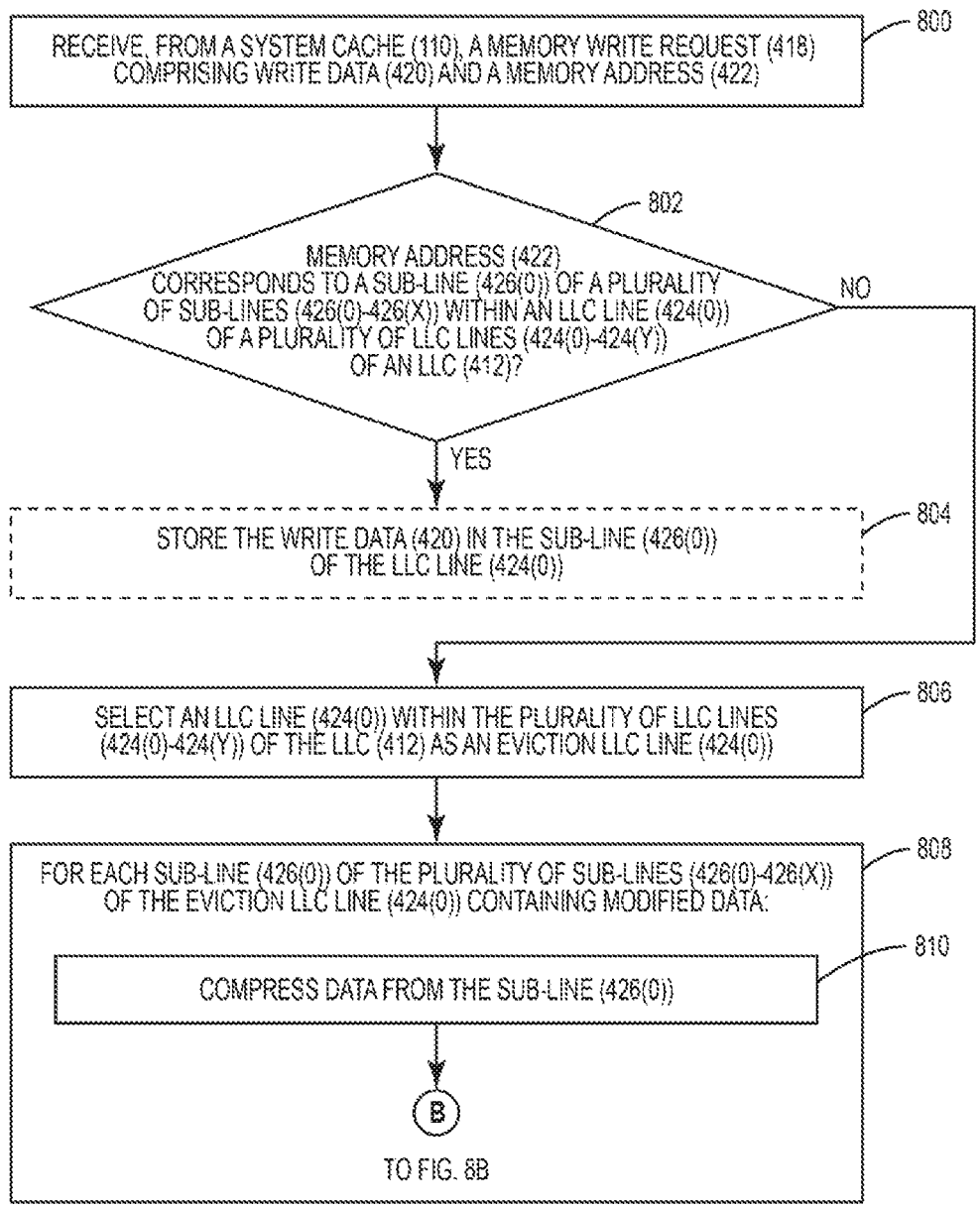
FIGS. 8A-8D are flowcharts illustrating exemplary operations for performing a memory write operation by the CMC of FIG. 2 using memory bandwidth compression.
Figure 8B:
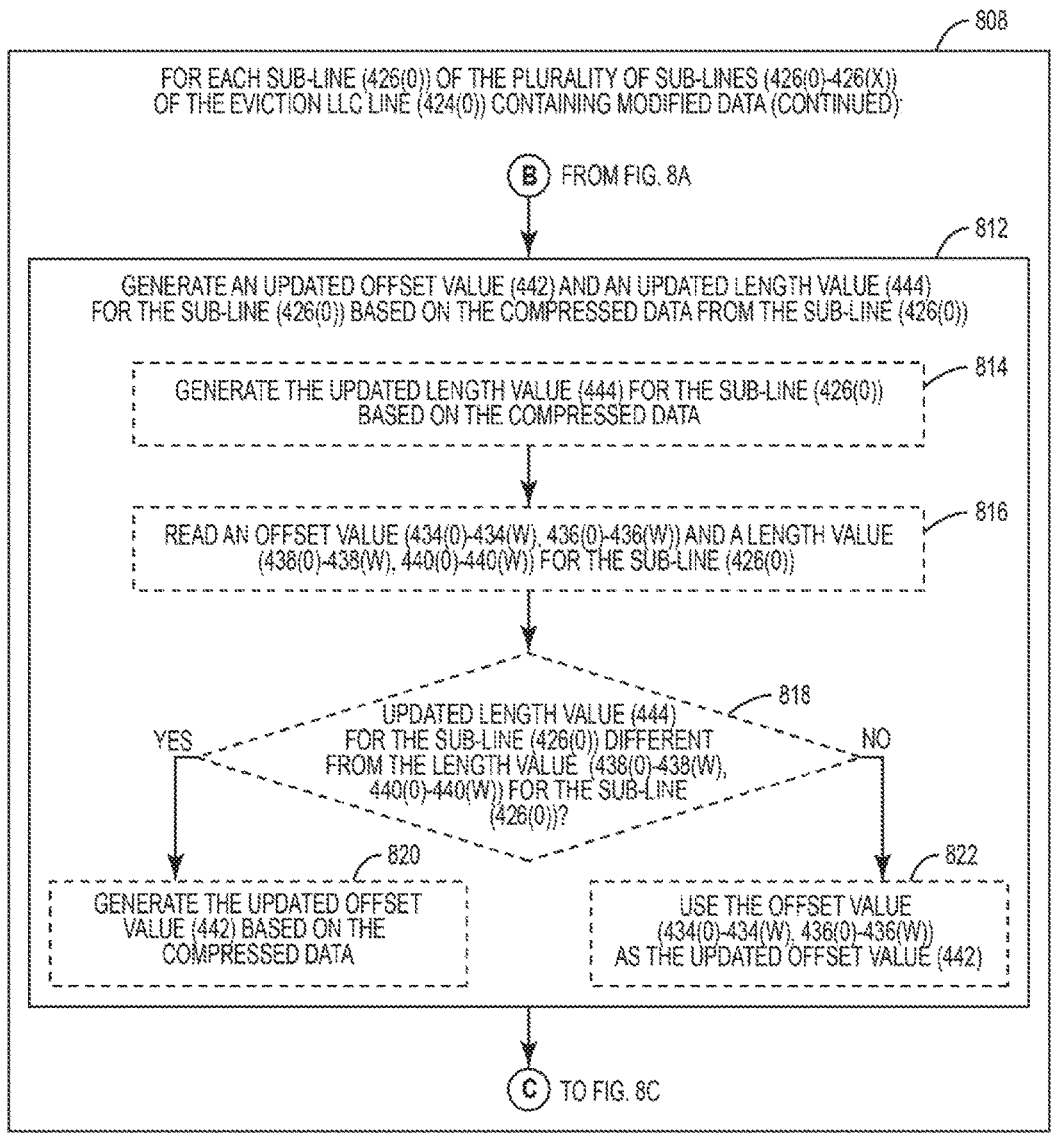

Turning now to FIG. 8B, the CMC 204 next generates an updated offset value 442 and an updated length value 444 for the sub-line 426(0) based on the compressed data from the sub-line 426(0) (block 812). Accordingly, the CMC 204 may be referred to herein as "a means for generating, for each sub-line of the plurality of sub-lines of the eviction LLC line containing modified data, an updated offset value and an updated length value based on the compressed data from the sub-line." Some aspects may provide that the updated offset value 442 may be generated based on one or more allocation rules as discussed above with respect to FIG. 5.

In some aspects, operations of block 812 for generating the updated offset value 442 and the updated length value 444 may include the CMC 204 generating the updated length value 444 for the sub-line 426(0) based on the compressed data (block 814). The CMC 204 may then read an offset value 434(0)-434(W), 436(0)-436(W) and a length value 438(0)-438(W), 440(0)-440(W) for the sub-line 426 (0) (block 816). For aspects in which the MT cache 446 is in use, the CMC 204 may first determine whether the offset value 434(0)-434(W), 436(0)-436(W) and the length value 438(0)-438(W), 440(0)-440(W) may be read from the MT cache 446. If a miss occurs upon checking the MT cache 446, the CMC 204 may then read the offset value 434(0)-434(W), 436(0)-436(W) and the length value 438(0)-438 (W), 440(0)-440(W) from the master table 430. In aspects in which the MT cache 446 is not used, the CMC 204 may read the offset value 434(0)-434(W), 436(0)-436(W) and the length value 438(0)-438(W), 440(0)-440(W) from the master table 430 in the system memory 206. The CMC 204 determines whether the updated length value 444 for the sub-line 426(0) is different from the length value 438(0)-438(W), 440(0)-440(W) for the sub-line 426(0) (block 818).

If the CMC 204 determines at decision block 818 that the updated length value 444 for the sub-line 426(0) is different from the length value 438(0)-438(W), 440(0)-440(W) for the sub-line 426(0), the CMC 204 may generate the updated offset value 442 based on the compressed data (block 820). However, if the updated length value 444 for the sub-line 426(0) is not different from the length value 438(0)-438(W), 440(0)-440(W), the CMC 204 may use the offset value 434(0)-434(W), 436(0)-436(W) as the updated offset value 442 (block 822). Processing then resumes at block 824 of FIG. 8C.

Figure 8C:
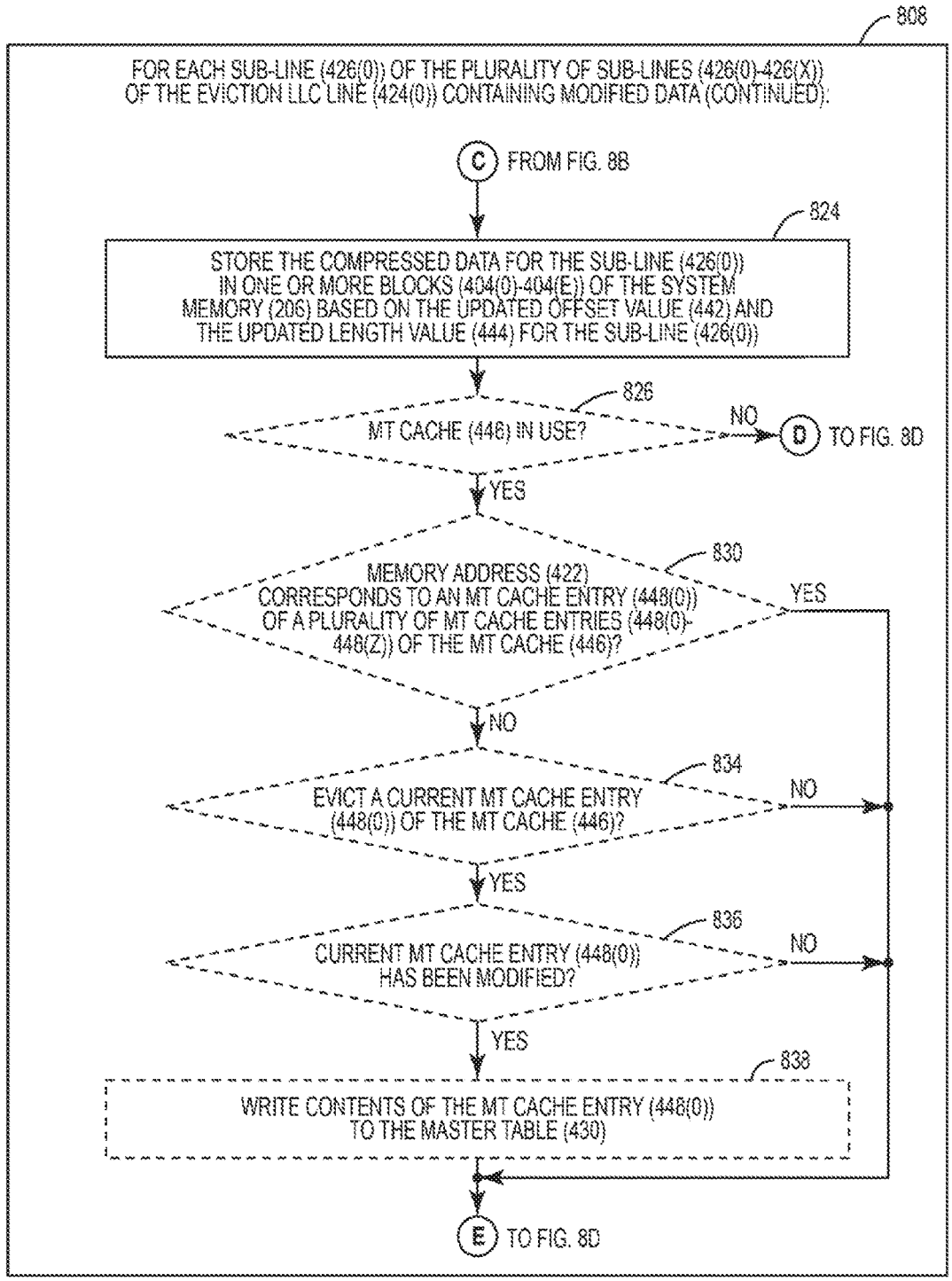

Referring now to FIG. 8C, the CMC 204 stores the compressed data for the sub-line 426(0) in one or more blocks 404(0)-404(E) of the system memory 206 based on the updated offset value 442 and the updated length value 444 for the sub-line 426(0) (block 824). The CMC 204 thus may be referred to herein as "a means for storing, for each sub-line of the plurality of sub-lines of the eviction LLC line containing modified data, the compressed data in one or more blocks of a system memory based on the updated offset value and the updated length value for the sub-line." According to some aspects, the CMC 204 may next determine whether the MT cache 446 is in use (block 826). If the MT cache 446 is not in use, processing resumes at block 828 of FIG. 8D. If the CMC 204 determines at decision block 826 that the MT cache 446 is in use, the CMC 204 determines whether the memory address 422 corresponds to an MT cache entry 448(0) of the plurality of MT cache entries 448(0)-448(Z) of the MT cache 446 (block 830). If so (i.e., a hit on the MT cache 446), processing resumes at block 832 of FIG. 8D.

However, if the CMC 204 determines at decision block 830 that the memory address 422 does not correspond to an MT cache entry 448(0) of the plurality of MT cache entries 448(0)-448(Z) (i.e., a miss on the MT cache 446), the CMC 204 determines whether to evict a current MT cache entry 448(0) of the MT cache 446 (block 834). If eviction is not necessary, processing resumes at block 832 of FIG. 8D. If the CMC 204 determines at decision block 834 that a current MT cache entry 448(0) should be evicted from the MT cache 446, the CMC 204 determines whether the current MT cache entry 448(0) has been modified (e.g., based on a dirty flag bit for the MT cache entry 448(0)) (block 836). If the MT cache entry 448(0) has not been modified, processing resumes at block 832 of FIG. 8D. If the MT cache entry 448(0) has been modified, the CMC 204 writes the contents of the MT cache entry 448(0) to the master table 430 (block 838). Processing then resumes at block 832 of FIG. 8D.

Figure 8D:
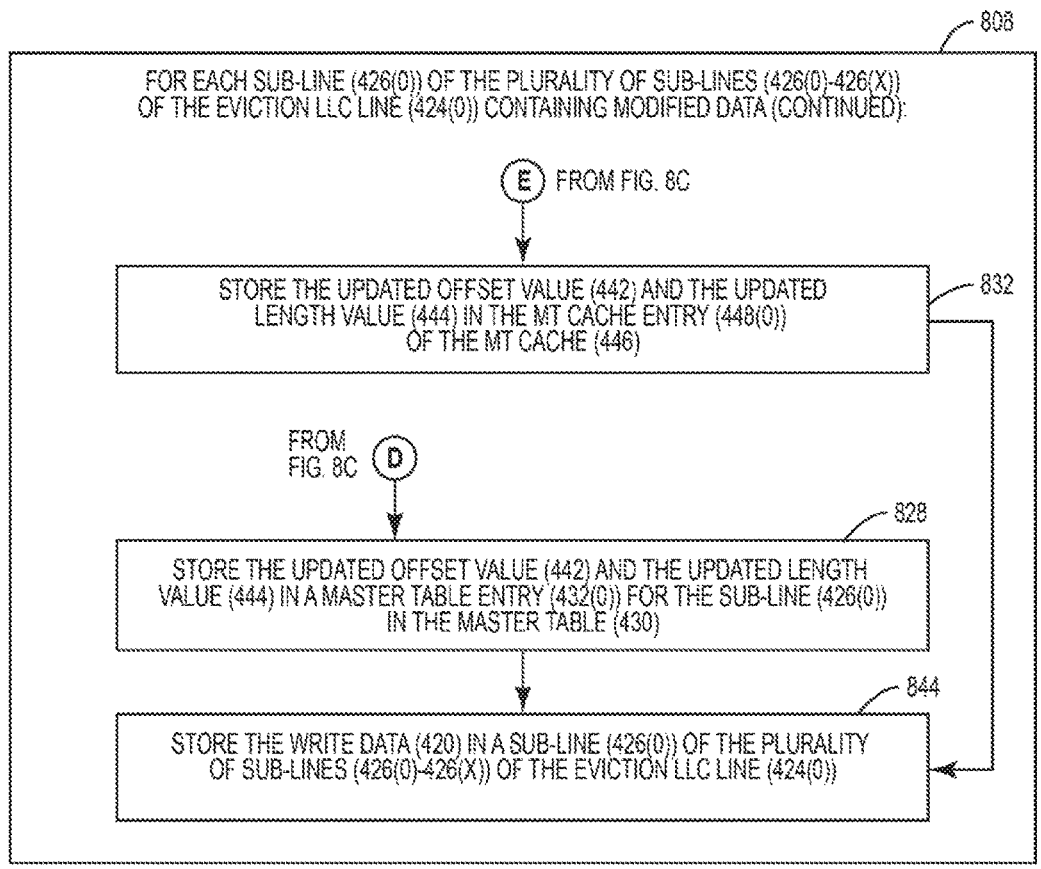

Reference is now made to FIG. 8D. In some aspects, one or more of the operations illustrated in FIG. 8D may be performed in parallel, and/or in an order other than that shown in FIG. 8D. In FIG. 8D, the CMC 204 stores the updated offset value 442 and the updated length value 444 in the MT cache entry 448(0) of the MT cache 446 (block 832). Processing then resumes at block 844. If the CMC 204 determines at decision block 826 of FIG. 8C that the MT cache 446 is not in use, the CMC 204 stores the updated offset value 442 and the updated length value 444 in a master table entry 432(0) for the sub-line 426(0) in the master table 430 (block 828). In this regard, the CMC 204 may be referred to herein as "a means for storing, for each sub-line of the plurality of sub-lines of the eviction LLC line containing modified data, the updated offset value and the updated length value in a master table entry for the sub-line in a master table." The CMC 204 stores the write data 420 in a sub-line 426(0) of the plurality of sub-lines 426(0)-426(X) of the eviction LLC line 424(0) (block 844). Accordingly, the CMC 204 may be referred to herein as "a means for storing the write data in a sub-line of the plurality of sub-lines of the eviction LLC line."

Providing memory bandwidth compression using multiple LLC lines in a CPU-based system according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 9:
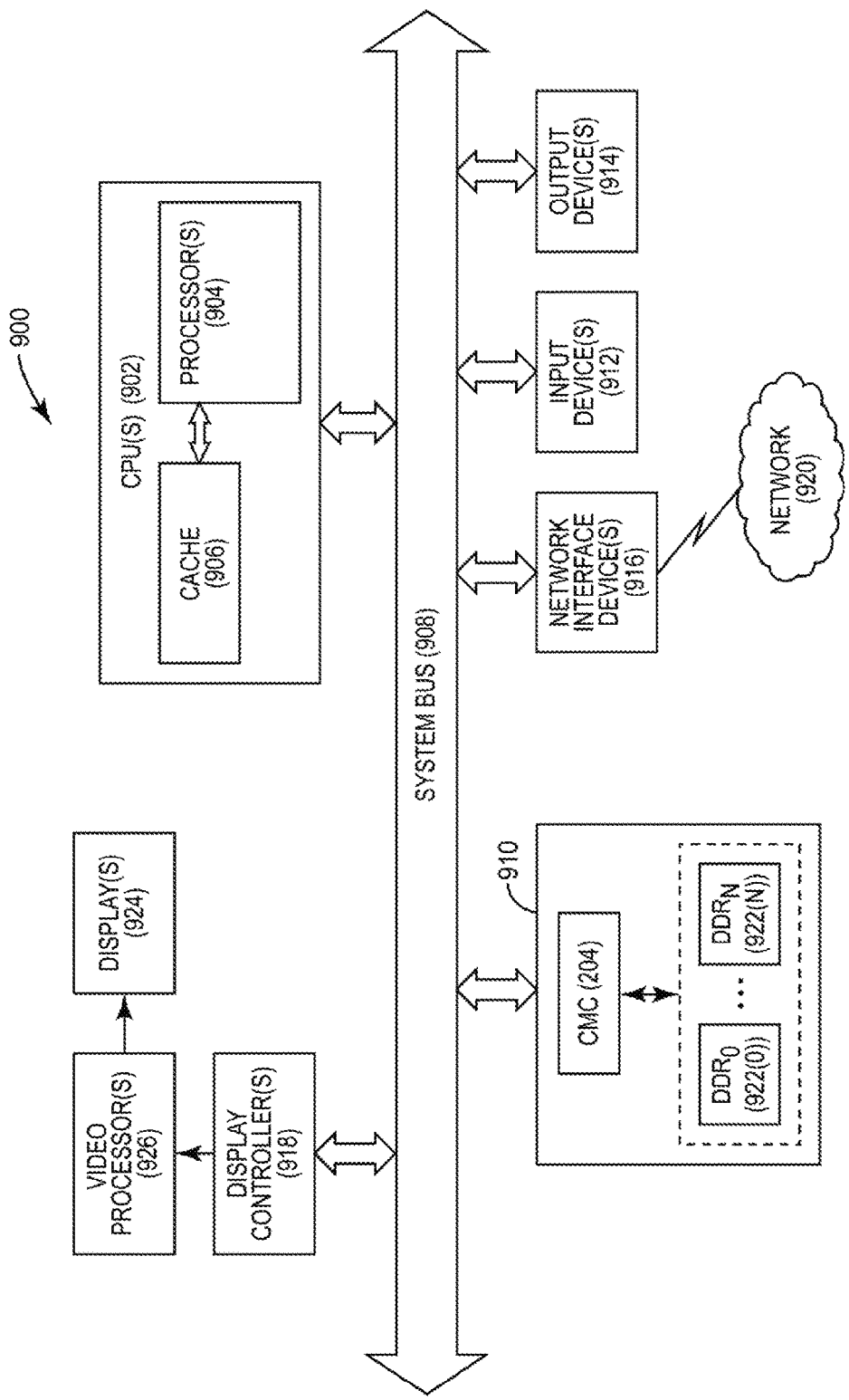
FIG. 9 is a block diagram of an exemplary processor-based system that may include the SoC of FIG. 1 that employs the CMC of FIG. 2.

In this regard, FIG. 9 illustrates an example of a processor-based system 900 that can employ the SoC 200 with the CMC 204 of FIG. 2. In this example, the processor-based system 900 includes one or more CPUs 902, each including one or more processors 904. The CPU(s) 902 may have cache memory 906 coupled to the processor(s) 904 for rapid access to temporarily stored data. The CPU(s) 902 is coupled to a system bus 908 and can intercouple devices included in the processor-based system 900. As is well known, the CPU(s) 902 communicates with these other devices by exchanging address, control, and data information over the system bus 908. For example, the CPU(s) 902 can communicate bus transaction requests to the CMC 204 as an example of a slave device. Although not illustrated in FIG. 9, multiple system buses 908 could be provided.

Other devices can be connected to the system bus 908. As illustrated in FIG. 9, these devices can include a memory system 910, one or more input devices 912, one or more output devices 914, one or more network interface devices 916, and one or more display controllers 918, as examples. The input device(s) 912 can include any type of input device, including but not limited to input keys, switches, voice processors, etc. The output device(s) 914 can include any type of output device, including but not limited to audio, video, other visual indicators, etc. The network interface device(s) 916 can be any devices configured to allow exchange of data to and from a network 920. The network 920 can be any type of network, including but not limited to a wired or wireless network, a private or public network, a local area network (LAN), a wide local area network, wireless local area network, BLUETOOTH (BT), and the Internet. The network interface device(s) 916 can be configured to support any type of communications protocol desired. The memory system 910 can include one or more memory units 922(0)-922(N).

The CPU(s) 902 may also be configured to access the display controller(s) 918 over the system bus 908 to control information sent to one or more displays 924. The display controller(s) 918 sends information to the display(s) 924 to be displayed via one or more video processors 926, which process the information to be displayed into a format suitable for the display(s) 924. The display(s) 924 can include any type of display, including but not limited to a cathode ray tube (CRT), a liquid crystal display (LCD), a light emitting diode (LED) display, a plasma display, etc.

The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A central processing unit (CPU)-based system comprising:
   a system memory;
   a system cache;
   a last-level cache (LLC) comprising a plurality of LLC lines each sized to store a plurality of sub-lines corresponding to a plurality of system cache lines of the system cache; and
   a compressed memory controller (CMC), comprising a memory interface configured to access the system memory and the system cache via a system bus, and communicatively coupled to the LLC;
   the CMC configured to:
      receive, from the system cache, a memory read request comprising a memory address;
      determine whether the memory address corresponds to a valid sub-line of the plurality of sub-lines within an LLC line of the plurality of LLC lines of the LLC; and
      responsive to determining that the memory address does not correspond to a valid sub-line of the plurality of sub-lines within an LLC line of the plurality of LLC lines of the LLC:
         read a master table entry containing an offset value and a length value for the LLC line from a master table in the system memory;
         retrieve one or more blocks from the system memory based on the memory address, the offset value, and the length value;
         store data from the retrieved one or more blocks in a sub-line of the plurality of sub-lines within an LLC line of the plurality of LLC lines of the LLC; and
         return the data from the retrieved one or more blocks to the system cache.

2. The CPU-based system of claim 1, wherein the CMC is configured to determine whether the memory address corresponds to a valid sub-line of the plurality of sub-lines within an LLC line of the plurality of LLC lines of the LLC by being configured to:
   determine whether the memory address corresponds to a sub-line of an existing LLC line within the plurality of LLC lines; and
   responsive to determining that the memory address corresponds to a sub-line of an existing LLC line within the plurality of LLC lines, determine whether the sub-line of the existing LLC line is valid.

3. The CPU-based system of claim 1, wherein the CMC is further configured to, responsive to determining that the memory address corresponds to a valid sub-line of the plurality of sub-lines within an LLC line of the plurality of LLC lines of the LLC, return data from the valid sub-line to the system cache.

4. The CPU-based system of claim 1, wherein the CMC is configured to store the data from the retrieved one or more blocks in the sub-line of the plurality of sub-lines within the LLC line of the plurality of LLC lines of the LLC by being configured to:
   determine, based on the length value, whether the data from the retrieved one or more blocks is compressed;
   responsive to determining that the data from the retrieved one or more blocks is not compressed, store the data from the retrieved one or more blocks in the sub-line of the plurality of sub-lines within the LLC line of the plurality of LLC lines of the LLC; and
   responsive to determining that the data from the retrieved one or more blocks is compressed:
      decompress the data from the retrieved one or more blocks; and store the decompressed data in the sub-line of the plurality of sub-lines within the LLC line of the plurality of LLC lines of the LLC.

5. The CPU-based system of claim 1, wherein the CMC is further configured to, prior to storing the data from the retrieved one or more blocks in the sub-line of the plurality of sub-lines within the LLC line of the plurality of LLC lines of the LLC:
select an LLC line of the plurality of LLC lines as an eviction LLC line;
store data from the plurality of sub-lines of the eviction LLC line in the system memory; and
store the data from the retrieved one or more blocks in a sub-line of the plurality of sub-lines within the eviction LLC line.

6. The CPU-based system of claim 5, wherein the CMC is configured to store the data from the plurality of sub-lines of the eviction LLC line in the system memory by being configured to:
read a plurality of master table entries each containing an offset value and a length value for each corresponding sub-line of the plurality of sub-lines of the eviction LLC line; and
for each sub-line of the plurality of sub-lines of the eviction LLC line containing modified data:
compress data from the sub-line;
generate an updated length value for the sub-line based on the compressed data from the sub-line;
determine whether the updated length value for the sub-line is different from the length value for the sub-line;
responsive to determining that the updated length value for the sub-line is not different from the length value for the sub-line, write the compressed data for the sub-line to one or more blocks of the system memory based on the offset value and the length value for the sub-line; and
responsive to determining that the updated length value for the sub-line is different from the length value for the sub-line:
generate an updated offset value for the sub-line;
write the compressed data for the sub-line to one or more blocks of the system memory based on the updated offset value and the updated length value for the sub-line; and
update a master table entry for the sub-line with the updated offset value and the updated length value.

7. The CPU-based system of claim 6, wherein the CMC is configured to generate the updated offset value for the sub-line based on one or more allocation rules comprising preventing the compressed data from straddling memory sub-line regions of the system memory corresponding to more than one sub-line, aligning the compressed data within the memory sub-line regions of the system memory, and grouping the compressed data for the plurality of sub-lines.

8. The CPU-based system of claim 1, further comprising a master table (MT) cache comprising a plurality of MT cache entries each configured to store a previously read master table entry;
the CMC further configured to, prior to reading the master table entry, determine whether the memory address corresponds to an MT cache entry of the plurality of MT cache entries of the MT cache;
the CMC configured to read the master table entry in the master table responsive to determining that the memory address does not correspond to an MT cache entry of the plurality of MT cache entries of the MT cache; and the CMC further configured to:
responsive to determining that the memory address does not correspond to an MT cache entry of the plurality MT cache entries of the MT cache, write the master table entry to an MT cache entry of the plurality of MT cache entries of the MT cache; and
responsive to determining that the memory address corresponds to an MT cache entry of the plurality MT cache entries of the MT cache, read the MT cache entry of the MT cache.

9. The CPU-based system of claim 8, wherein the CMC is further configured to, prior to writing the master table entry to the MT cache entry of the plurality of MT cache entries of the MT cache:
determine whether a current MT cache entry of the plurality of MT cache entries of the MT cache should be evicted; and
responsive to determining that the current MT cache entry should be evicted:
determine whether the current MT cache entry has been updated; and
responsive to determining that the current MT cache entry has been updated, write contents of the current MT cache entry to the master table.

10. The CPU-based system of claim 1, wherein the CMC is further configured to:
read one or more master table entries containing one or more offset values and one or more length values for one or more remaining sub-lines of the plurality of sub-lines within the LLC line of the plurality of LLC lines of the LLC;
retrieve the one or more blocks from the system memory based on the one or more offset values and the one or more length values; and
store the data from the retrieved one or more blocks in the one or more remaining sub-lines of the plurality of sub-lines within the LLC line of the plurality of LLC lines of the LLC.

11. The CPU-based system of claim 1 integrated into an integrated circuit (IC).

12. The CPU-based system of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

13. A method for providing memory bandwidth compression for memory read operations, comprising:
receiving, by a compressed memory controller (CMC) from a system cache, a memory read request comprising a memory address;
determining whether the memory address corresponds to a valid sub-line of a plurality of sub-lines within a last-level cache (LLC) line of a plurality of LLC lines of an LLC; and
responsive to determining that the memory address does not correspond to a valid sub-line of the plurality of sub-lines within an LLC line of the plurality of LLC lines of the LLC:

reading a master table entry containing an offset value
and a length value for the LLC line from a master
table in a system memory;
retrieving one or more blocks from the system memory
based on the memory address, the offset value, and
the length value;
storing data from the retrieved one or more blocks in a
sub-line of the plurality of sub-lines within an LLC
line of the plurality of LLC lines of the LLC; and
returning the data from the retrieved one or more
blocks to the system cache.

14. The method claim 13, wherein determining whether the memory address corresponds to a valid sub-line of the plurality of sub-lines within an LLC line of the plurality of LLC lines of the LLC comprises:
determining whether the memory address corresponds to a sub-line of the plurality of sub-lines within an existing LLC line of the plurality of LLC lines of the LLC; and
responsive to determining that the memory address corresponds to a sub-line of the plurality of sub-lines within an existing LLC line of the plurality of LLC lines of the LLC, determining whether the sub-line of the existing LLC line is valid.

15. The method of claim 13, further comprising, responsive to determining that the memory address corresponds to a valid sub-line of the plurality of sub-lines within an LLC line of the plurality of LLC lines of the LLC, returning data from the valid sub-line to the system cache.

16. The method of claim 13, wherein storing the data from the retrieved one or more blocks in the sub-line of the plurality of sub-lines within the LLC line of the plurality of LLC lines of the LLC comprises:
determining, based on the length value, whether the data from the retrieved one or more blocks is compressed;
responsive to determining that the data from the retrieved one or more blocks is not compressed, storing the data from the retrieved one or more blocks in the sub-line of the plurality of sub-lines within the LLC line of the plurality of LLC lines of the LLC; and
responsive to determining that the data from the retrieved one or more blocks is compressed:
decompressing the data from the retrieved one or more blocks; and
storing the decompressed data in the sub-line of the plurality of sub-lines within the LLC line of the plurality of LLC lines of the LLC.

17. The method of claim 13, further comprising, prior to storing the data from the retrieved one or more blocks in the sub-line of the plurality of sub-lines within the LLC line of the plurality of LLC lines of the LLC:
selecting an LLC line of the plurality of LLC lines as an eviction LLC line;
storing data from the plurality of sub-lines of the eviction LLC line in the system memory; and
storing the data from the retrieved one or more blocks in a sub-line of the plurality of sub-lines within the eviction LLC line.

18. The method of claim 17, wherein storing the data from the plurality of sub-lines of the eviction LLC line in the system memory comprises:
reading a plurality of master table entries each containing an offset value and a length value for each corresponding sub-line of the plurality of sub-lines of the eviction LLC line; and
for each sub-line of the plurality of sub-lines of the eviction LLC line containing modified data:
compressing data from the sub-line;
generating an updated length value for the sub-line based on the compressed data from the sub-line;
determining whether the updated length value for the sub-line is different from the length value for the sub-line;
responsive to determining that the updated length value for the sub-line is not different from the length value for the sub-line, writing the compressed data for the sub-line to one or more blocks of the system memory based on the offset value and the length value for the sub-line; and
responsive to determining that the updated length value for the sub-line is different from the length value for the sub-line:
generate an updated offset value for the sub-line;
writing the compressed data for the sub-line to one or more blocks of the system memory based on the updated offset value and the updated length value for the sub-line; and
updating the master table entry for the sub-line with the updated offset value and the updated length value.

19. The method of claim 18, wherein generating the updated offset value for the sub-line is based on one or more allocation rules comprising preventing the compressed data from straddling memory sub-line regions of the system memory corresponding to more than one sub-line, aligning the compressed data within the memory sub-line regions of the system memory, and grouping the compressed data for the plurality of sub-lines.

20. The method of claim 13, further comprising:
prior to reading the master table entry in the master table, determining whether the memory address corresponds to a master table (MT) cache entry of a plurality of MT cache entries of an MT cache, each MT cache entry configured to store a previously read master table entry;
responsive to determining that the memory address does not correspond to an MT cache entry of the plurality MT cache entries of the MT cache:
reading the master table entry in the master table; and
writing the master table entry to an MT cache entry of the plurality of MT cache entries of the MT cache; and
responsive to determining that the memory address corresponds to an MT cache entry of the plurality MT cache entries of the MT cache, reading the MT cache entry of the plurality of MT cache entries of the MT cache.

21. The method of claim 20, further comprising, prior to writing the master table entry to the MT cache entry of the plurality of MT cache entries of the MT cache:
determining whether a current MT cache entry of the plurality of MT cache entries of the MT cache should be evicted; and
responsive to determining that the current MT cache entry should be evicted:
determining whether the current MT cache entry has been updated; and
responsive to determining that the current MT cache entry has been updated, writing contents of the current MT cache entry to the master table.

22. The method of claim 13, further comprising:
reading one or more master table entries containing one or more offset values and one or more length values for one or more remaining sub-lines of the plurality of sub-lines of an LLC line of the plurality of LLC lines of the LLC;

retrieving one or more blocks from the system memory based on the one or more offset values and the one or more length values; and storing the data from the retrieved one or more blocks in the one or more remaining sub-lines of the plurality of sub-lines within the LLC line of the plurality of LLC lines of the LLC.

* * * * *